US012559138B2

(12) United States Patent
Woelki et al.

(10) Patent No.: US 12,559,138 B2
(45) Date of Patent: Feb. 24, 2026

(54) MACHINE-LEARNED MODEL ARCHITECTURE FOR DIVERSE OBJECT PATH PREDICTION

(71) Applicant: Zoox, Inc., Foster City, CA (US)

(72) Inventors: Gregory Michael Woelki, Foster City, CA (US); Xiaosi Zeng, Redwood City, CA (US); Gowtham Garimella, Hayward, CA (US); Samir Parikh, Los Gatos, CA (US); Ethan Miller Pronovost, Redwood City, CA (US)

(73) Assignee: Zoox, Inc., Foster City, CA (US)

( * ) Notice: Subject to any disclaimer, the term of this patent is extended or adjusted under 35 U.S.C. 154(b) by 195 days.

(21) Appl. No.: 18/516,618

(22) Filed: Nov. 21, 2023

(65) Prior Publication Data

US 2025/0162616 A1     May 22, 2025

(51) Int. Cl.
*B60W 60/00* (2020.01)
*B60W 50/06* (2006.01)

(52) U.S. Cl.
CPC ........ *B60W 60/0016* (2020.02); *B60W 50/06* (2013.01); *B60W 2554/80* (2020.02)

(58) Field of Classification Search
CPC ............. B60W 60/0016; B60W 50/06; B60W 2554/80
See application file for complete search history.

(56) References Cited

U.S. PATENT DOCUMENTS

| | | | |
|---|---|---|---|
| 10,649,459 B2 | 5/2020 | Wang et al. | |
| 2020/0174481 A1* | 6/2020 | Van Heukelom | .... G05D 1/0214 |
| 2021/0181758 A1* | 6/2021 | Das | ......... G06F 18/25 |
| 2022/0135029 A1* | 5/2022 | Poubel Orenstein | ...................... B60W 30/0953 701/301 |
| 2022/0153310 A1* | 5/2022 | Yang | ................. B60W 60/0027 |
| 2022/0363256 A1* | 11/2022 | Dax | .................... B60W 40/105 |
| 2023/0041975 A1 | 2/2023 | Caldwell et al. | |
| 2023/0097121 A1 | 3/2023 | Schwartz et al. | |
| 2024/0157973 A1* | 5/2024 | Pini | ................... B60W 50/0097 |
| 2025/0162612 A1 | 5/2025 | Woelki | |

OTHER PUBLICATIONS

Office Action for U.S. Appl. No. 18/516,779, dated Jun. 4, 2025, 26 Pages.
Search Report and Written Opinion for International Application No. PCT/US2024/053250, Dated Feb. 12, 2025, 10 pages.
U.S. Appl. No. 18/084,419, filed Dec. 19, 2022, 94 pages.
U.S. Appl. No. 18/375,292, filed Sep. 29, 2023, 73 pages.

* cited by examiner

*Primary Examiner* — Naeem Taslim Alam
(74) *Attorney, Agent, or Firm* — Lee & Hayes, P.C.

(57) ABSTRACT

A machine-learned architecture may predict a set of spatially-diverse paths that an object may take in the future. The paths generated by this architecture may be time-invariant (e.g., not identifying a time at which the object may occupy a position along one of these paths) but can be used by a second machine-learned model to predict progress in time along these paths. This segregation of the spatial paths and progress in time along the paths improves the accuracy of the ultimate prediction and better captures rare object behavior.

20 Claims, 11 Drawing Sheets

PEDESTRIAN TRACKS

VEHICLE TRACKS

800

1000 ⟍

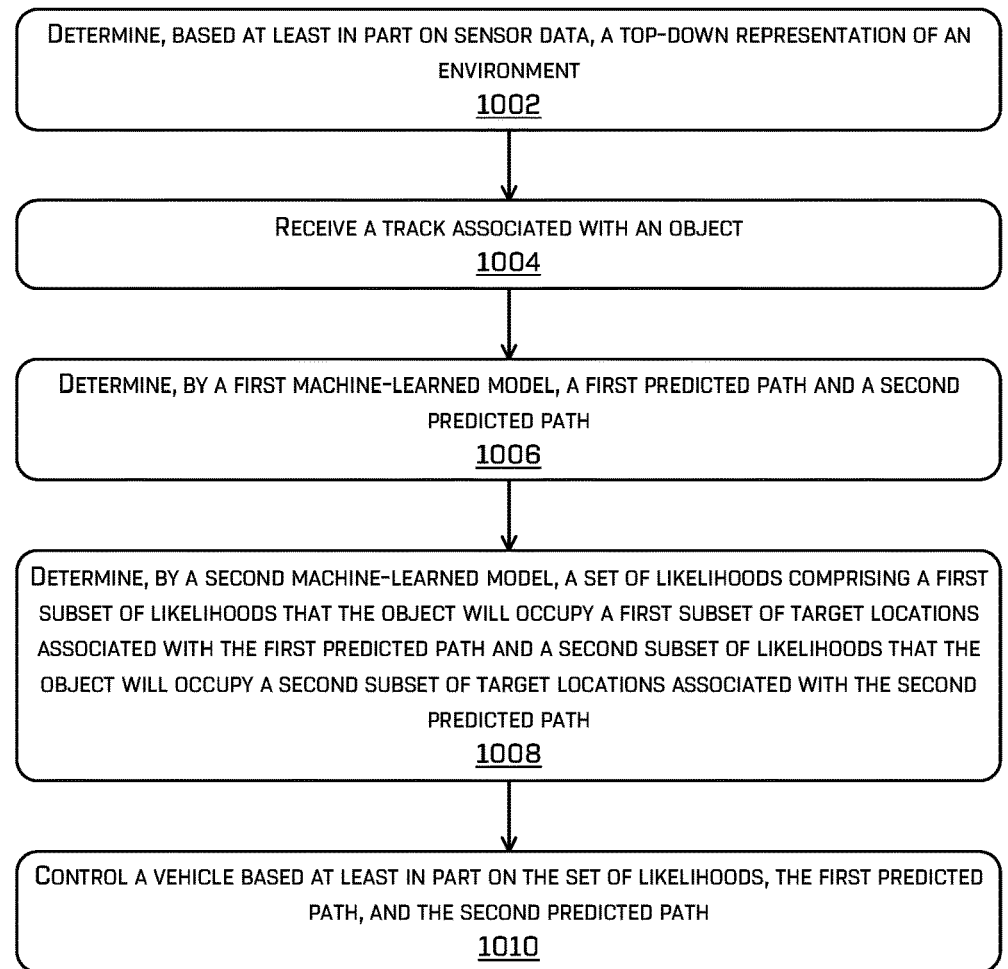

DETERMINE, BASED AT LEAST IN PART ON SENSOR DATA, A TOP-DOWN REPRESENTATION OF AN ENVIRONMENT
1002

RECEIVE A TRACK ASSOCIATED WITH AN OBJECT
1004

DETERMINE, BY A FIRST MACHINE-LEARNED MODEL, A FIRST PREDICTED PATH AND A SECOND PREDICTED PATH
1006

DETERMINE, BY A SECOND MACHINE-LEARNED MODEL, A SET OF LIKELIHOODS COMPRISING A FIRST SUBSET OF LIKELIHOODS THAT THE OBJECT WILL OCCUPY A FIRST SUBSET OF TARGET LOCATIONS ASSOCIATED WITH THE FIRST PREDICTED PATH AND A SECOND SUBSET OF LIKELIHOODS THAT THE OBJECT WILL OCCUPY A SECOND SUBSET OF TARGET LOCATIONS ASSOCIATED WITH THE SECOND PREDICTED PATH
1008

CONTROL A VEHICLE BASED AT LEAST IN PART ON THE SET OF LIKELIHOODS, THE FIRST PREDICTED PATH, AND THE SECOND PREDICTED PATH
1010

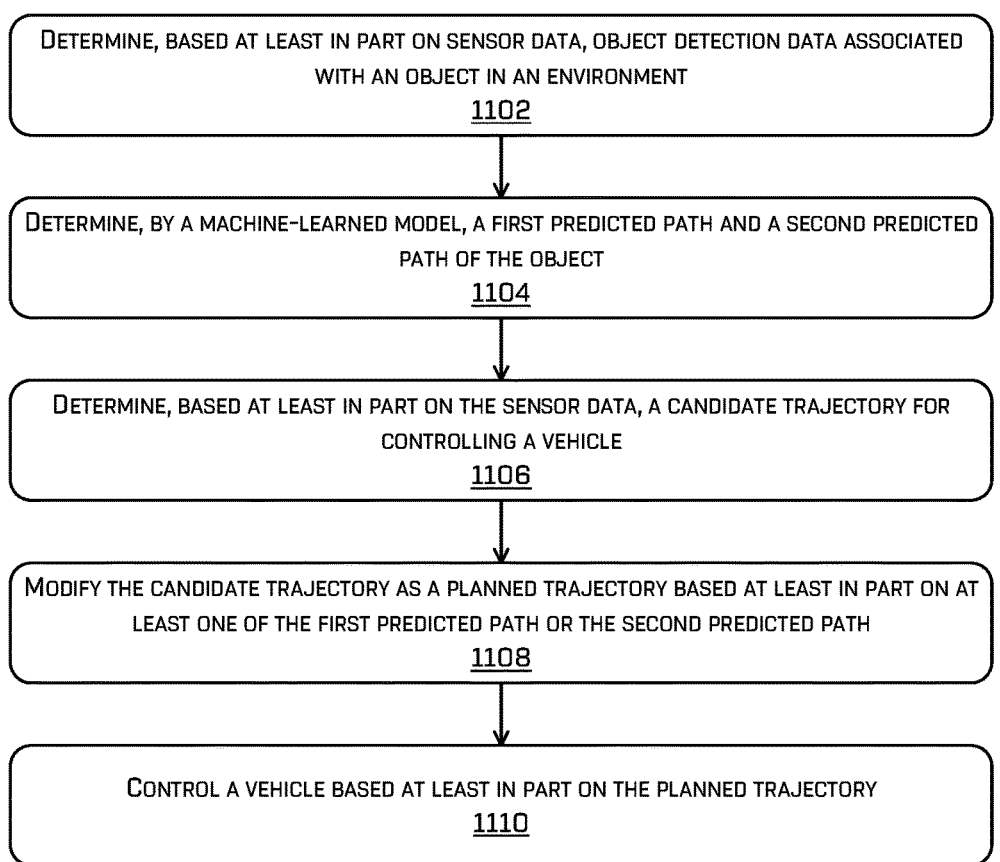

DETERMINE, BASED AT LEAST IN PART ON SENSOR DATA, OBJECT DETECTION DATA ASSOCIATED WITH AN OBJECT IN AN ENVIRONMENT
1102

DETERMINE, BY A MACHINE-LEARNED MODEL, A FIRST PREDICTED PATH AND A SECOND PREDICTED PATH OF THE OBJECT
1104

DETERMINE, BASED AT LEAST IN PART ON THE SENSOR DATA, A CANDIDATE TRAJECTORY FOR CONTROLLING A VEHICLE
1106

MODIFY THE CANDIDATE TRAJECTORY AS A PLANNED TRAJECTORY BASED AT LEAST IN PART ON AT LEAST ONE OF THE FIRST PREDICTED PATH OR THE SECOND PREDICTED PATH
1108

CONTROL A VEHICLE BASED AT LEAST IN PART ON THE PLANNED TRAJECTORY
1110

FIG. 11

MACHINE-LEARNED MODEL ARCHITECTURE FOR DIVERSE OBJECT PATH PREDICTION

BACKGROUND

In dense urban environments and other scenarios, the number of objects, both moving and stationary, that an autonomous vehicle detects may be high. The number of objects detected may directly affect the amount of computational resources the autonomous vehicle uses (e.g., for tracking objects). Predicting where these objects will be and what they will be doing in the future is critical for operating an autonomous vehicle safely and efficiently, but it is an immensely complex and difficult problem that may require significant computational resources. Moreover, not every object in an environment may be relevant to how the autonomous vehicle is operated, and identifying which objects are relevant to the autonomous vehicle's operations is non-trivial without human guidance. Furthermore, it is difficult to accurately predict how an object will react to actions of the autonomous vehicle and even more difficult to predict rare behavior, like erratic movement, a vehicle that moves out of turn according to rules of the road or that makes an illegal maneuver, or the like.

BRIEF DESCRIPTION OF THE DRAWINGS

The detailed description is described with reference to the accompanying figures. In the figures, the left-most digit(s) of a reference number identify the figure in which the reference number first appears. The same reference numbers in different figures indicate similar or identical items.

FIG. 10 depicts a flow diagram of an example process for determining time-invariant paths for an object and using those time-invariant paths to control a vehicle.

FIG. 11 depicts a flow diagram of an example process for determining time-invariant paths for an object and using those time-invariant paths to control a vehicle.

DETAILED DESCRIPTION

Figure 1:
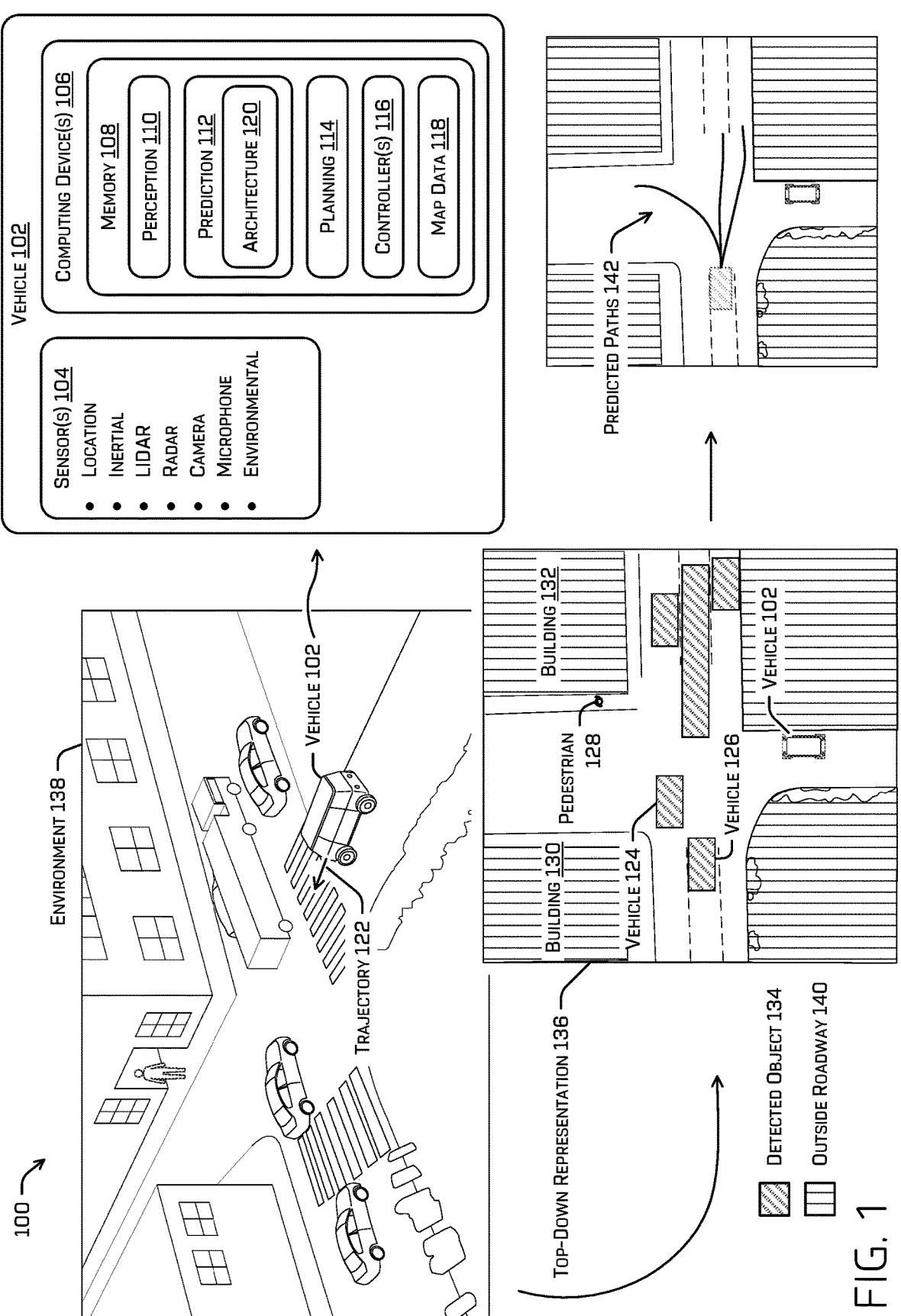
FIG. 1 illustrates an autonomous vehicle and an example scenario illustrating the prediction of diverse time-invariant object paths prediction using the machine-learned model architecture discussed herein.

The techniques (e.g., hardware, software, machines, and/or processes) discussed herein may include a machine learning model that predicts diverse time-invariant paths for an object. For example, a vehicle may detect an object in the environment in which the vehicle is operating and the machine-learned model may predict various paths that the object may take in the future. A predicted path may indicate a set of locations that the object may occupy in the future and a path may be time-invariant by not specifying a time at which the object would occupy a location along the path/not varying the path or locations thereof based on time. A time-invariant path, as discussed herein, may additionally or alternatively indicate a set of object states associated with an object that the machine-learned model discussed herein predicts that the object may exist in at an unspecified future point. In some examples, the time-invariant path may indicate a sequence or series of these states and an object state may indicate any dynamic object states associated with an object such as, for example, position, orientation, velocity, acceleration, and/or any other dynamic state (e.g., door/aperture state, indicator state, parking state). A time-invariant path may additionally or alternatively comprise a data structure that may identify a set or series of changes to a current object state instead of or in addition to object states themselves. In other words, instead of identifying a specific object state, the path may identify a change to a last object state in a series of object states. Additionally or alternatively, a time-invariant path may indicate a set or series of object state(s) an object is predicted to realize within a distance from a current position of the object. Additionally or alternatively, a time-invariant path may indicate a set or series of object state(s) an object is predicted to realize within a time period into the future without identifying the specific times up to the expiration of the time period that the object state(s) may be realized. In other words, in such an example, the time-invariant path may indicate a set of object state(s) that may be realized by an object within the time window, but no object state is associated with a specific time. That means that in examples where the object state(s) are part of a series, the last object state isn't even necessarily associated with a time at which the time period would expire.

The paths predicted for an object may be diverse in that they may vary widely from each other (e.g., they may diverge from each other in space). This diversity may be achieved by structuring the machine-learned model architecture to output multiple predicted paths and training the machine-learned model architecture using gradient descent on a loss determined for just the closest path to a ground truth path instead of a loss applied over all the paths predicted by the machine-learned model architecture. Other techniques may result in multiple paths predicted for an object not varying much if at all, resulting in substantially similar paths or paths that don't account for completely different vehicle behavior, such as completing a U-turn, turning right or left, or the like in addition to variations of the lane in which the object is predicted to occupy.

In some examples, the machine-learned model may use a top-down representation of the environment and object data determined as part of detecting the object to determine a set of paths that an object is predicted to potentially take in the future. For example, to determine one of these predicted paths, a machine-learned model may determine a set of target locations that the object may occupy in the future and a second machine-learned model may determine a probability distribution or Gaussian mixture model (GMM) over this set of target locations. In some examples, a target location may indicate a position, orientation, and/or state of the object at a future time and the probability distribution or GMM may be considered a set of likelihoods over the set of target locations. The predicted path may then be determined by determining a subset of the set of target locations that are the top n target locations as ranked by probability (as indicated in the probability distribution) or by component weight (as indicated in the GMM). This subset of target locations may then be used as a predicted path as part of the set of paths predicted for an object.

The top-down representation used by the machine-learned model may be determined by receiving sensor data from one or more sensors and may determine a top-down representation of the environment, which may be a birds eye view image that encodes information associated with the environment such as a detected object in the environment and/or map data (e.g., which may indicate a roadway shape and extents, signage, static object(s), and/or the like), as discussed in U.S. Patent Application Pub. No. 2021/0181758, filed Jan. 30, 2020, the entirety of which is incorporated by reference herein for all purposes.

In some examples, a planning component of the autonomous vehicle may use the set of paths to determine a predicted trajectory for the object. Whereas a predicted path is time invariant, the predicted trajectory may be time-variant, indicating a set of position(s), orientation(s), and/or state(s) the object is predicted to take over future times. For example, to determine the predicted trajectory from the set of time-invariant paths, the planning component or a prediction component may simulate movement of the object based at least in part on the set of paths, a candidate action for controlling the vehicle, and/or a top-down representation of the environment. For example, the predicted trajectory may be determined by a machine-learned model that uses this data as input and may determine a predicted position, orientation, and/or state of the object over a first time period. The machine-learned model may then determine subsequent predicted trajectory(ies) for the object over subsequent time periods up to a time horizon as part of a tree search for determining a series of actions for controlling the vehicle where each time period is associated with a potentially different action for controlling the vehicle. In other words, the machine-learned model for determining the predicted trajectory may iteratively/progressively update the predicted trajectory as further candidate actions (in time or in distance) are determined for the vehicle.

For example, the tree search may iteratively determine different candidate actions for each time period of a series of time periods. The machine-learned model may determine a predicted trajectory based at least in part on a candidate action and the tree search may select a first candidate action associated with a first time period to use to explore further candidate actions stemming from the first candidate action at a second time period. In some examples, a cost may be determined by a cost function for each candidate action based at least in part on the predicted trajectory. The machine-learned model may update the predicted trajectory for an object that was determined for the first candidate action based at least in part on one of the candidate actions determined for the second time step. The tree search may repeat this process until a time horizon, distance, or target location is achieved. The tree search may also account for objects classified as not being relevant to operation planning by the vehicle, but may use the passive prediction for those objects. In some examples, the passive prediction may be determined by the tree search using a kinematics model or neural network, but that isn't based on the candidate action(s) of the vehicle.

Additionally or alternatively, the planning component of a vehicle may use at least one of the paths of the set of paths to determine a region in which the vehicle may not travel. For example, if a perception component of the autonomous vehicle classifies the object as having the dynamic classification, "parking," the planning component may use a path generated for that object that overlaps one or more parking spaces to determine a region that includes the path that the planning component will exclude from consideration for planning an action of the vehicle. In some examples, the planning component may determine the region based at least in part on determining a region that would be occupied by the object if the object were to follow the path plus a lateral buffer distance (e.g., 1 meter, 2 meters). Additionally or alternatively, the planning component may determine that a path overlaps one or more parking spaces and may determine this region for exclusion based on this determination instead of or in addition to receiving a classification that the object is parking from the perception component. In some examples, the planning component may additionally or alternatively determine a region to exclude from the planning space using a path of the set of based at least in part on based at least in part on receiving an indication from the perception component that the object is acting erratically (e.g., swerving, accelerating and decelerating repeatedly, confidence score determined by the perception component for the object is below a threshold confidence score such as may be caused by the object moving forward and backward repeatedly), receiving a classification associated with the object indicating that the object is a construction vehicle or emergency services or law enforcement vehicle, or the like.

Additionally or alternatively, a planning component of a vehicle may use this set of paths to determine whether an object is relevant to operations of the vehicle. For example, some objects may not be relevant to operations of the vehicle, such as by heading away from the vehicle or a path of the vehicle or lacking an intent to move in such a manner. In such an example, a portion of the computational resources used for tracking such objects may unnecessarily complicate the computations the vehicle uses to plan next actions by the vehicle. In total, this ends up increasing the time and/or computations required to plan a next action for the vehicle and may even be computationally prohibitive. The techniques may include determining to classify objects detected by the vehicle as being either "active objects" or "inactive objects." An "active object" may be an object that is sufficiently likely (as determined by the techniques discussed herein) to affect or be affected by the vehicle's operational planning, whereas "inactive objects" are determined to not be likely to affect or be affected by the vehicle's operational planning. See U.S. patent application Ser. No. 18/375,292, filed Sep. 29, 2023, the entirety of which is incorporated by reference herein for all purposes.

In some examples, predicting motion of an object may differ depending on whether the object was classified as active or inactive. Motion of inactive objects may be predicted by a kinematics model or a neural network that doesn't use a candidate action of the vehicle as input; whereas, motion of active objects may be predicted by a machine-learned model that uses a candidate action of the vehicle as input and that may require more computing resources as the machine-learned model may be more complex and/or may use additional data as compared to the kinematics model or neural network used for inactive objects. For example, the machine-learned model for predicting active object motion and/or state(s) may use a top-down representation of the environment (which may embed object detection, map, and/or environment state data), object detection data (e.g., object track, object classification, object state), vehicle path, vehicle candidate trajectory, and/or the like to determine an active predicted trajectory. Whereas a kinematic model may use current and/or historical motion of the object alone, confined by some map features or the neural network may use the object track and a more rudimentary environment representation.

Classifying an object as an active object may comprise determining that at least one path of the set of objects determined for the object intersects a planned path or candidate action of the vehicle. In an example where multiple objects have been detected and a set of paths have been determined for each object, the vehicle may filter out any objects that do not have any paths that intersect with the planned path or candidate action for the vehicle. Classifying an object as an active object may further comprise determining a location at which the object path and the vehicle path/candidate action intersect and determining a first time window (or first distance range in which the object will be located at a time) that the object may reach the location and a second time window (or second distance range in which the vehicle will be located at a time) that the vehicle may reach the location. If the first time window and second window (or first distance range and second distance range) overlap, the object may be classified as an active object; otherwise, if the first time window and the second window do not overlap, the object may be classified as an inactive object.

In some examples, determining the first time window for the object path may be based at least in part on the location and an estimated upper bound acceleration and a lower bound acceleration that the object may exert. In some examples, the upper bound acceleration and/or lower bound acceleration may be determined by current object data detected by the vehicle and/or historical object data. In an additional or alternate example, a machine-learned model may determine the upper bound acceleration and/or lower bound acceleration based at least in part on an object track (e.g., current and/or historical object detection data) and/or environment state data. Additionally or alternatively, this machine-learned model may determine a confidence score associated with the upper bound acceleration and/or lower bound acceleration that indicates the probability that the upper bound acceleration and/or lower bound acceleration are accurate.

In some examples, determining the second time window for the vehicle may be based at least in part on a candidate action for controlling the vehicle that may specify a position, heading, velocity, and/or acceleration for the vehicle to achieve by the time it reaches the location plus and/or minus a time constant to account for potential variations from the candidate action.

In some examples, the techniques discussed herein may additionally or alternatively comprise improving the accuracy of predicting an object's reaction to a candidate action for controlling the vehicle. The techniques may include using a path of the set of paths predicted for an object to determine a predicted trajectory (i.e., that may include time(s) associated with position(s), orientation(s), and/or state(s) of the object) that the object may take that are based at least in part on a candidate action of the vehicle. Determining this predicted trajectory may comprise determining, based at least in part on an object track, object detection data, and/or a top-down representation of an environment, a control profile. The control profile may include a velocity and/or acceleration profile, which may include velocity (ies) and/or acceleration(s) over time and/or gain(s) associated with simulating movement of the object over time. For example, different control profiles may be generalized as "assertive," "conservative," "nominal," "hesitant," or the like. Additionally or alternatively, the control profile may comprise a machine-learned model output that controls movement of the object along the path. Regardless, the machine-learned model output or the control profile may control progress of a simulated representation of the object along the path. In other words, the techniques described herein allow the machine-learned model or control profile to merely need to determine progress along the path instead of needing to both determine where the object will be and how it will be oriented over time. In some examples, different control profiles may be used as part of the tree search as alternate possible outcomes that are based at least in part on a candidate action determined for the vehicle as part of the tree search.

Additionally or alternatively, determining a predicted trajectory of the object by determining displacement of the object along a path may be used to more accurately predict and model adversarial behavior of an object, like making an illegal or out-of-turn maneuver. By not needing to predict the time at which an object will occupy a location and by promoting diversity of the paths generated for an object according to the training techniques discussed herein, the variety of the paths may be increased and the potential for an object to make an adversarial maneuver is more likely to be predicted by the techniques discussed herein.

In some examples, the techniques discussed herein may additionally or alternatively include determining a right-of-way of a detected object and/or of the vehicle. Determining the right-of-way may comprise determining that a path of a set of paths determined for the detected object intersects a planned path or candidate action of the vehicle. The techniques may then determine a location associated with the intersection and may determine, based at least in part on map data, rules of the road applicable to the location. For example, if the location is in the middle of a stop sign controlled intersection, the map data may indicate that the location is associated with rules-of-the road related to passing through a stop sign controlled intersection (e.g., which may define which entity should go through the intersection first depending on the time at which the entity arrived at a stop line and/or the entity's relative placement in the intersection relative to another entity that is stopped or travelling through the intersection). In some examples, the relevant rule of the road may additionally or alternatively be based on a state of another detected object in the environment such as a traffic control device (e.g., a stoplight). This method is advantageous because the paths discussed herein do not include time variance and, accordingly, there is no need to predict exactly where an object will be in the future. In some examples, the relevant rule of the road may additionally or alternatively be based on a lane in which the object or the vehicle is located.

In some examples, the techniques discussed herein may additionally or alternatively include using the set of paths or one of the paths of the set of paths to determine a lane with which an object is associated. For example, this may include determining a lane or series of lanes that a path is collocated within based at least in part on map data. In some examples, instead of determining whether an object path and a vehicle path or candidate action intersect, the techniques may include determining whether the object lane and a lane associated with the vehicle path or candidate action are the same lane or are two lanes that intersect, such as at a junction or intersection. For example, if the object and the vehicle are approaching a four-way stop and the object is travelling perpendicularly to the vehicle from the left side of the vehicle and the object is matched to a lane associated with a right-hand turn and the vehicle's planned path takes would take the vehicle straight through the intersection, there would be no conflict between the object and the vehicle. This indication of no conflict can be used to determine that the object is not relevant to path planning of the vehicle (unless a different path of the object passes through the intersection perpendicular to the vehicle's planned path, which would be an illegal maneuver and would cause a conflict).

In some examples, training the machine-learned model architecture for predicting a set of time-invariant paths associated with a detected object may include techniques for promoting the diversity of those paths. Those techniques may include features of the architecture itself and how the components are configured and/or the method in which the architecture is trained. For example, training the architecture may include determining a first difference between a ground truth path that the object was observed as taking (e.g., based on sensor data) and a first predicted path of the set of paths, determining a second difference between the ground truth path and a second predicted path of the set of paths, determining that the first difference is less than the second difference, and altering one or more parameters of the architecture to reduce the first difference according to a gradient descent training algorithm and exclude the second difference from training. In other words, the training may promote diversity by only regressing parameter(s) of the architecture using a loss determined for only the closest path to the ground truth rather than an average loss over or multiple individual losses for multiple or all of the paths in the set of paths determined by the architecture for the object. This may result in preventing different paths from becoming more similar to each other, e.g., by becoming closer in space to each other, by indicating the same or nearly the same future spatial locations and only differing by varying a future speed of the object.

However, in some examples, training the machine-learned model may vary based on object classification. For example, some types of objects, such as cable cars or trains, may travel over a pre-determine path, and some objects may be restricted to a particular lane by legal rules (e.g., busses or taxis must use a particular lane). For training data associated with such object classifications or combinations of object classification and map data (as in the case of a taxi-restricted lane), training the machine-learned model may comprise determining sub-losses for each path generated by the machine-learned model for the special object classification (e.g., cable car, train, taxi in a tax mandated lane) and determining a total loss based at least in part on the sub-losses. This total loss may then be propagated through the machine-learned model using gradient descent by altering one or more parameters of the machine-learned model to reduce the total loss. This may have the effect of collapsing the paths generated for such an object or for an object that currently exists in a restricted lane. Collapsing the paths means that the paths generated for this object by the machine-learned model may become more spatially similar or even the same. In an additional or alternate example, the machine-learned model may be restricted to outputting a single time-invariant path for one of these special objects if an object is associated with a special object classification (e.g., train, cable car) or a special object classification-map data combination (e.g., bus in a bus-mandated lane, taxi in a tax-mandated lane).

Additionally or alternatively, the techniques discussed herein may determine to use time-invariant paths for an object or may determine to revert to a time-variant trajectory prediction for some objects. For example, the techniques may default to generating time-invariant paths for all objects, unless the vehicle detects that a set of conditions is met for predicting an object's trajectory using a machine-learned model that determines a time-variant predicted trajectory for the object. The set of conditions may specify, for example, that a detected object is within a threshold distance of another object (e.g., a pedestrian is near to a vehicle and/or that an aperture (e.g., door) of the vehicle is open, a pedestrian is approaching a door to a building, a vehicle is pulling into a parking space), determining that an object is leaving a region associated with the vehicle (e.g., a pedestrian or vehicle is leaving an area around the vehicle), and/or the like.

Additionally or alternatively, the techniques discussed herein may limit a length of one or more time-invariant paths generated by the machine-learned model discussed herein. For example, the length of a time-invariant path may be capped based at least in part on one or more of a furthest distance that the vehicle can progress in the environment within a threshold amount of time, a maximum sensor effective range of one or more sensors of the vehicle, a state of the object (e.g., an object is detected as being stationary for more than a threshold amount of time, such as a seated pedestrian or a parked vehicle), determining that an object is approaching a terminal point (e.g., a building door, a parking space, an on-ramp/off-ramp), and/or the like. Additionally or alternatively, in some cases the confidence score associated with object states in a time-invariant path may decrease as the distance/displacement along the path increases. In such an example, the machine-learned model discussed herein may limit the length of the time-invariant path and/or object state(s) indicated thereby to those object states that meet or exceed a threshold confidence score or those object states that meet or exceed a sliding-window average or average threshold confidence score.

The techniques discussed herein may increase the accuracy of predicted movements of an object by modeling a wider diversity of potential movements of the object and by allowing a machine-learned model to specialize in spatial prediction rather than generalizing to include both spatial and time prediction. The time-invariant paths may also allow subsequent operations and/or machine-learned model to more accurately predict a reaction of an object to a candidate action for controlling the vehicle, predict conflicts between an object and the vehicle, determine object(s) relevant to vehicle operation planning, determine an order of right-of-way, and/or the like. Moreover, the techniques discussed herein may reduce latency and computational processing and/or storage for predicting a future object trajectory by filtering object(s) by relevancy to vehicle operation planning and using different prediction components based on whether an object was classified as an active object or an inactive object. Reductions in latency and computational processing and/or storage may reduce energy usage and may reduce autonomous vehicle stutters or hesitations that may be caused by latency. The techniques discussed herein may further allow longer predictions for objects in space and/or time. For example, the spatial intent of slow-moving objects may not be adequately captured for a time window since that object's ultimate plans for movement may lay outside that time-window. Moreover, since the techniques comprise segregating the spatial and temporal predictions, the spatial predictions may be determined farther out in space than would otherwise being possible with limited computational processing when the prediction included spatial and temporal predictions by a same prediction component. All of the techniques discussed herein may improve the safety and efficacy of autonomous vehicle operations by the increased accuracy and diversity of the paths and predicted object trajectories discussed herein.

Example Scenario

FIG. 1 illustrates an example scenario 100 including a vehicle 102. In some instances, the vehicle 102 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 102 may be a fully or partially autonomous vehicle having any other level or classification. It is contemplated that the techniques discussed herein may apply to more than robotic control, such as for autonomous vehicles. For example, the techniques discussed herein may be applied to mining, manufacturing, augmented reality, etc. Moreover, even though the vehicle 102 is depicted as a land vehicle, vehicle 102 may be a spacecraft, watercraft, and/or the like.

According to the techniques discussed herein, the vehicle 102 may receive sensor data from sensor(s) 104 of the vehicle 102. For example, the sensor(s) 104 may include a location sensor (e.g., a global positioning system (GPS) sensor), an inertia sensor (e.g., an accelerometer sensor, a gyroscope sensor, etc.), a magnetic field sensor (e.g., a compass), a position/velocity/acceleration sensor (e.g., a speedometer, a drive system sensor), odometry data (which may be determined based at least in part on inertial measurements and/or an odometer of the vehicle 102), a depth position sensor (e.g., a lidar sensor, a radar sensor, a sonar sensor, a time of flight (ToF) camera, a depth camera, an ultrasonic and/or sonar sensor), an image sensor (e.g., a visual light camera, infrared camera), an audio sensor (e.g., a microphone), and/or environmental sensor (e.g., a barometer, a hygrometer, etc.).

The sensor(s) 104 may generate sensor data, which may be received by computing device(s) 106 associated with the vehicle 102. However, in other examples, some or all of the sensor(s) 104 and/or computing device(s) 106 may be separate from and/or disposed remotely from the vehicle 102 and data capture, processing, commands, and/or controls may be communicated to/from the vehicle 102 by one or more remote computing devices via wired and/or wireless networks.

Computing device(s) 106 may comprise a memory 108 storing a perception component 110, a prediction component 112, a planning component 114, system controller(s) 116, map data 118, and/or architecture 120. For example, the memory 108 may store processor-executable instructions that, when executed by one or more processors, execute various operations discussed herein. In some examples, the perception component 110 may include a simultaneous localization and mapping (SLAM) component.

In general, the perception component 110 may determine what is in the environment surrounding the vehicle 102 and the planning component 114 may determine how to operate the vehicle 102 according to information received from the perception component 110. For example, the planning component 114 may determine trajectory 122 for controlling the vehicle 102 based at least in part on the perception data and/or other information such as, for example, localization information (e.g., where the vehicle 102 is in the environment relative to a map and/or features detected by the perception component 110), a output determined by the architecture 120 such as a set of paths associated with one of the detected objects, a predicted trajectory for an object, classification of an object as being active or inactive, a lane or series of lanes associated with one of the paths of the set of paths, a right-of-way indication or priority level associated with an object, a control profile for predicting the object's future trajectory, and/or the like. In some examples, the perception component 110 may comprise a pipeline of hardware and/or software, which may include one or more graphics processing unit(s) (GPU(s)), tensor processing unit(s) (TPU(s)), central processing unit(s) (CPU(s)), application-specific integrated circuit(s) (ASIC(s)), field-programmable gate array(s) (FPGA(s)), ML model(s), Kalman filter(s), and/or the like.

The trajectory 122 may comprise instructions for controller(s) 116 to actuate drive components of the vehicle 102 to effectuate a steering angle, steering rate, acceleration, and/or the like, which may result in a vehicle position, vehicle velocity, and/or vehicle acceleration. For example, the trajectory 122 may comprise a target heading, target steering angle, target steering rate, target position, target velocity, and/or target acceleration for the controller(s) 116 to track. In some examples, the trajectory 122 may be associated with controls sufficient to control the vehicle 102 over a time horizon (e.g., 5 milliseconds, 10 milliseconds, 100 milliseconds, 200 milliseconds, 0.5 seconds, 1 second, 2 seconds, etc.) or a distance horizon (e.g., 1 meter, 2 meters, 5 meters, 8 meters, 10 meters).

In some examples, the perception component 110 may receive sensor data from the sensor(s) 104 and determine data related to objects in the vicinity of the vehicle 102 (e.g., classifications associated with detected objects, instance segmentation(s), semantic segmentation(s), two and/or three-dimensional bounding boxes, tracks), route data that specifies a destination of the vehicle, global map data that identifies characteristics of roadways (e.g., features detectable in different sensor modalities useful for localizing the autonomous vehicle), a pose of the vehicle (e.g. position and/or orientation in the environment, which may be determined by or in coordination with a localization component), local map data that identifies characteristics detected in proximity to the vehicle (e.g., locations and/or dimensions of buildings, trees, fences, fire hydrants, stop signs, and any other feature detectable in various sensor modalities), etc.

In particular, the perception component 110 may determine, based at least in part on sensor data, an object detection indicating an association of a portion of sensor data with an object in the environment. The object detection may indicate an object classification (e.g., semantic label, object state), sensor data segmentation (e.g., mask, instance segmentation, semantic segmentation), a region of interest (ROI) identifying a portion of sensor data associated with the object, object classification, and/or a confidence score indicating a likelihood (e.g., posterior probability) that the object classification, ROI, and/or sensor data segmentation is correct/accurate (there may be confidence score generated for each in some examples). For example, the ROI may include a portion of an image or radar data identified by an ML model or ML pipeline of the perception component 110 as being associated with the object, such as using a bounding box, mask, an instance segmentation, and/or a semantic segmentation. The object classifications determined by the perception component 110 may distinguish between different object types such as, for example, a passenger vehicle, a pedestrian, a bicyclist, a delivery truck, a semi-truck, traffic signage, and/or the like. In some examples, object detections may be tracked over time. For example, a track may associate two object detections generated at two different times as being associated with a same object and may comprise a historical and/or current object position, orientation, velocity, acceleration, classification, and/or other state of that object (e.g., door/aperture state, turning state, intent state such as activation turn signal).

To give a concrete example, the vehicle 102 may receive sensor data including image data (from one or more image sensors) and/or other sensor data associated with the environment, such as lidar data, radar data, ToF data, and/or the like. The perception component may detect and classify objects in the environment. For example, the perception component may detect dynamic objects, such as a cyclist, vehicle, pedestrian, or the like, and/or static objects, such as poles, traffic signage, general signage, a drivable surface, sidewalk, public furniture, building, etc. Referring to FIG. 1, the perception component 110 may detect vehicle 124, vehicle 126, pedestrian 128, and other objects, such as objects indicated by diagonally-hashed rectangles 134 in the top-down representation 136. In some examples, the perception component 110 may additionally or alternatively detect building 130 and building 132. In some examples, these buildings may additionally or alternatively be indicated in map data 118 stored in the memory 108. The map data 118 may indicate other stationary (static) objects and/or zones, such as crosswalks, sidewalks, signage, construction zones (e.g., which may be temporarily indicated in the map data), rules of the road (e.g., yield priority, right-of-way rules, speed limits, mandated stops) associated with regions of the environment (e.g., junctions, crosswalks, lanes), and/or the like.

In some examples, the perception component 110 may additionally or alternatively determine a likelihood that a portion of the environment is occluded to one or more sensors and/or which particular sensor types of the vehicle. For example, a region may be occluded to a camera but not to radar or, in fog, a region may be occluded to the lidar sensors but not to cameras or radar to the same extent.

The perception component 110 may additionally or alternatively determine a top-down representation 136 of the environment based at least in part on the sensor data, as discussed in U.S. Patent Application Pub. No. 2021/0181758, filed Jan. 30, 2020, and/or U.S. Pat. No. 10,649,459, filed Apr. 26, 2018, the entirety of which are incorporated by reference herein for all purposes. For example, the top-down representation may be generated based at least in part on an object detection generated by the perception component 110 and/or map data 118. FIG. 1 depicts an example top-down representation 136 that may be generated by the perception component 110 based at least in part on sensor data and/or map data 118 for the environment 138. This top-down representation 136 may include indications of detected objects as diagonally-hashed rectangles 134 and portions of the environment outside the roadway may be indicated by vertical hashes 140. In some examples, the top-down representation may include a data structure, such as an image, where each pixel is associated with one or more channels indicating different characteristics of the environment.

For example, instead of indicating color data, a pixel of the top-down representation may indicate object data and/or map data, each of which may include one or more channels of the image. In an RGB image, a first channel indicates an amount of red at a pixel, a second channel indicates an amount of blue at the pixel, and a third channel indicates an amount green at the pixel, which collectively make up a color for that pixel. However, for a top-down representation, a pixel may have channel(s) dedicated to different object data that may include a global location of the pixel (i.e., a location in the environment that the pixel is associated with), whether an object is detected as existing at the pixel location or a likelihood that an object exists at the pixel/environment location, an orientation of an object indicated as existing at the location, a velocity and/or acceleration of the object, a classification associated with an object, whether an object is static or dynamic, a track associated with the object, a signage state (e.g., red light, green light, lane unavailable, directionality of a lane), other object state (e.g., left turn signal on, vehicle left side door open), map data, environment state data (e.g., a state of a traffic light, a weather condition, or the like, although environment state data may incorporate map data and/or object data in some examples), and/or the like. To further illustrate how this may practically be carried out as an example and without limitation, an object instance channel of the pixel may indicate a binary indication, such as 1 or 0, that an object exists at the pixel/location or a likelihood that an object exists at the pixel/location that was output by the perception component 110 as a number between 0 and 1 may be converted to a value that may depend on a number of bits or dynamic range associated with the pixel.

For example, if a channel of a pixel of the top-down representation 136 has 32-bits, the likelihood may be converted to a 32-bit representation of the number between 0 and 1-a likelihood of 0.25 could be represented as the value 8 or a likelihood of 0.3 could be represented as the value 10 in the object instance channel for that pixel. Pixel channels may have more or less bits and may encode object data differently. For example, a semantic object classification may be encoded using a value where 0 represents no object being present, 1 represents a pedestrian, 2 represents a vehicle, 3 represents an oversized vehicle, 4 represents a construction zone, and/or the like. To give another candidate example, object orientation may be quantized such that orientations between 0 and 10° may be quantized as the value 0, orientations between 10° and 20° may be quantized as the value 1, and so on, depending on the number of bits available for an orientation channel associated with the pixel. In an additional or alternate example, one of the object channels may indicate whether other object channels are associated with current, previous, or predicted object data.

In some examples, multiple versions of the top-down representation environment may be determined in association with different times. For example, a first top-down representation may be associated with a current environment state (e.g., current object detections, map data, and/or general environment state data), one or more second top-down representations may be associated with previous environment state(s), and/or one or more third top-down representations may be associated with predicted environment state(s).

The top-down representation 136 may additionally or alternatively include channel(s) indicating map data, such as the existence of a roadway, a type of roadway junction (e.g., four-way controlled intersection, T-junction uncontrolled, six-way light-controlled intersection), signage existence and/or type (e.g., yield sign, traffic control light), sidewalk existence, region of interest (e.g., construction zone, crosswalk, parking location, passenger pickup/drop-off location), and/or the like. The channel(s) of the top-down representation 136 may additionally or alternatively indicate that a location associated with a pixel is outside a roadway and/or a sidewalk to facilitate exclusion of some areas of the top-down representation from processing by the architecture 120 discussed herein to reduce latency and computational processing.

The data produced by the perception component 110 may be collectively referred to as perception data, which may include the top-down representation 136, object detection data, and/or a track associated with an object. Once the perception component 110 has generated perception data, the perception component 110 may provide the perception data to prediction component 112 and/or the planning component 114. The perception data may additionally or alternatively be stored in association with the sensor data as log data. This log data may be transmitted to a remote computing device (unillustrated in FIG. 1 for clarity) for use as at least part of training data for architecture 120.

In some examples, the prediction component 112 may receive sensor data and/or perception data and may determine a predicted state of dynamic objects in the environment. In some examples, dynamic objects may include objects that move or change states in some way, like traffic lights, moving bridges, train gates, and the like. The prediction component 112 may use such data to a predict a future state, such as a signage state, position, orientation, velocity, acceleration, other object state, or the like, which collectively may be described as prediction data. For example, the architecture 120 discussed herein may determine a set of predicted paths 142 for a detected object, such as vehicle 126. The predicted paths 142 may comprise a path that includes predicted object positions and/or orientations of the object, depicted as a line. Although FIG. 1 depicts three paths in the set of paths, there may be more or less paths in the set of paths predicted by the architecture 120. Moreover, a path may be continuous, identifying continuous positions and/or orientations, or it may be discrete, identifying discrete positions and/or orientations along the path. The set of paths may be time-invariant, which may mean that the paths do not change based on time or indicate any times associated with the paths.

The planning component 114 may use the perception data received from perception component 110 and/or prediction data received from the prediction component 112 and/or architecture 120, to determine one or more trajectories, control motion of the vehicle 102 to traverse a path or route, and/or otherwise control operation of the vehicle 102, though any such operation may be performed in various other components (e.g., localization may be performed by a localization component, which may be based at least in part on perception data). For example, the planning component 114 may determine a route for the vehicle 102 from a first location to a second location; generate, substantially simultaneously and based at least in part on the perception data and/or simulated perception data (which may further include predictions regarding detected objects in such data), a plurality of candidate trajectories for controlling motion of the vehicle 102 in accordance with a receding horizon technique (e.g., 1 micro-second, half a second) to control the vehicle to traverse the route (e.g., in order to avoid any of the detected objects); and select one of the candidate trajectories as a trajectory 122 of the vehicle 102 that may be used to generate a drive control signal that may be transmitted to drive components of the vehicle 102. In some examples, the trajectory 122 may be part of a series of trajectories (i.e., a path) determined by a tree search conducted by the planning component 114 based at least in part on the sensor data, perception data, prediction data, map data 118, and/or top-down representation 136, as discussed in more detail in U.S. Patent Application Pub. No. 2023/0041975, filed Aug. 4, 2021, the entirety of which is incorporated by reference herein for all purposes. FIG. 1 depicts an example of such a trajectory 122, represented as an arrow indicating a heading, velocity, and/or acceleration, although the trajectory itself may comprise instructions for controller(s) 116, which may, in turn, actuate a drive system of the vehicle 102.

In some examples, the planning component 114 may determine the trajectory 122 based at least in part on determining a predicted trajectory (that may be time-variant) for an object that may be determined based at least in part on one or up to all of the set of paths determined by the architecture 120, a right-of-way determination for the object, lane(s) determined to be associated with the object based at least in part on one or up to all of the set of paths determined by the architecture 120, or the like.

In some examples, the controller(s) 116 may comprise software and/or hardware for actuating drive components of the vehicle 102 sufficient to track the trajectory 122. For example, the controller(s) 116 may comprise one or more proportional-integral-derivative (PID) controllers to control vehicle 102 to track trajectory 122.

Example System

Figure 2:
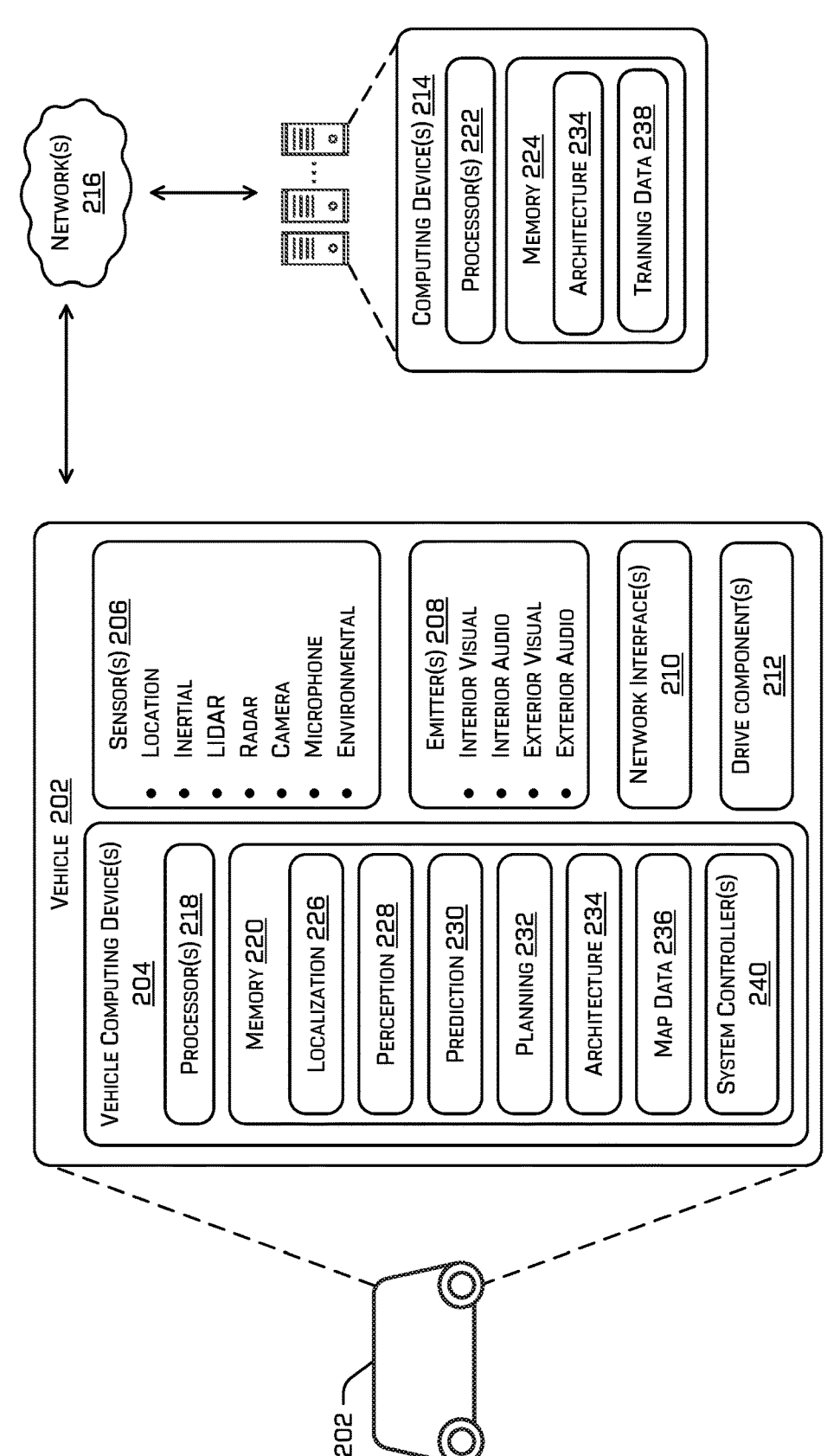
FIG. 2 illustrates a block diagram of an example system integrating and/or training the machine-learned model architecture discussed herein and/or a planning component that can use diverse time-invariant object paths for a variety of techniques to improve the safety and efficacy of a vehicle.

FIG. 2 illustrates a block diagram of an example system 200 that implements the techniques discussed herein. In some instances, the example system 200 may include a vehicle 202, which may represent the vehicle 102 in FIG. 1. In some instances, the vehicle 202 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 202 may be a fully or partially autonomous vehicle having any other level or classification. Moreover, in some instances, the techniques described herein may be usable by non-autonomous vehicles as well.

The vehicle 202 may include a vehicle computing device(s) 204, sensor(s) 206, emitter(s) 208, network interface(s) 210, and/or drive component(s) 212. Vehicle computing device(s) 204 may represent computing device(s) 106 and sensor(s) 206 may represent sensor(s) 104. The system 200 may additionally or alternatively comprise computing device(s) 214.

In some instances, the sensor(s) 206 may represent sensor(s) 104 and may include lidar sensors, radar sensors, ultrasonic transducers, sonar sensors, location sensors (e.g., global positioning system (GPS), compass, etc.), inertial sensors (e.g., inertial measurement units (IMUs), accelerometers, magnetometers, gyroscopes, etc.), image sensors (e.g., red-green-blue (RGB), infrared (IR), intensity, depth, time of flight cameras, etc.), microphones, wheel encoders, environment sensors (e.g., thermometer, hygrometer, light sensors, pressure sensors, etc.), etc. The sensor(s) 206 may include multiple instances of each of these or other types of sensors. For instance, the radar sensors may include individual radar sensors located at the corners, front, back, sides, and/or top of the vehicle 202. As another example, the cameras may include multiple cameras disposed at various locations about the exterior and/or interior of the vehicle 202. The sensor(s) 206 may provide input to the vehicle computing device(s) 204 and/or to computing device(s) 214.

The vehicle 202 may also include emitter(s) 208 for emitting light and/or sound, as described above. The emitter(s) 208 in this example may include interior audio and visual emitter(s) to communicate with passengers of the vehicle 202. By way of example and not limitation, interior emitter(s) may include speakers, lights, signs, display screens, touch screens, haptic emitter(s) (e.g., vibration and/or force feedback), mechanical actuators (e.g., seatbelt tensioners, seat positioners, headrest positioners, etc.), and the like. The emitter(s) 208 in this example may also include exterior emitter(s). By way of example and not limitation, the exterior emitter(s) in this example include lights to signal a direction of travel or other indicator of vehicle action (e.g., indicator lights, signs, light arrays, etc.), and one or more audio emitter(s) (e.g., speakers, speaker arrays, horns, etc.) to audibly communicate with pedestrians or other nearby vehicles, one or more of which comprising acoustic beam steering technology.

The vehicle 202 may also include network interface(s) 210 that enable communication between the vehicle 202 and one or more other local or remote computing device(s). For instance, the network interface(s) 210 may facilitate communication with other local computing device(s) on the vehicle 202 and/or the drive component(s) 212. Also, the network interface(s) 210 may additionally or alternatively allow the vehicle to communicate with other nearby computing device(s) (e.g., other nearby vehicles, traffic signals, etc.). The network interface(s) 210 may additionally or alternatively enable the vehicle 202 to communicate with computing device(s) 214. In some examples, computing device(s) 214 may comprise one or more nodes of a distributed computing system (e.g., a cloud computing architecture).

The network interface(s) 210 may include physical and/or logical interfaces for connecting the vehicle computing device(s) 204 to another computing device or a network, such as network(s) 216. For example, the network interface(s) 210 may enable Wi-Fi-based communication such as via frequencies defined by the IEEE 802.11 standards, short range wireless frequencies such as ultra-high frequency (UHF) (e.g., Bluetooth®, satellite), cellular communication (e.g., 3G, 4G, 4G LTE, 5G, etc.), or any suitable wired or wireless communications protocol that enables the respective computing device to interface with the other computing device(s). In some instances, the vehicle computing device(s) 204 and/or the sensor(s) 206 may send sensor data, via the network(s) 216, to the computing device(s) 214 at a particular frequency, after a lapse of a predetermined period of time, in near real-time, etc.

In some instances, the vehicle 202 may include one or more drive components 212. In some instances, the vehicle 202 may have a single drive component 212. In some instances, the drive component(s) 212 may include one or more sensors to detect conditions of the drive component(s) 212 and/or the surroundings of the vehicle 202. By way of example and not limitation, the sensor(s) of the drive component(s) 212 may include one or more wheel encoders (e.g., rotary encoders) to sense rotation of the wheels of the drive components, inertial sensors (e.g., inertial measurement units, accelerometers, gyroscopes, magnetometers, etc.) to measure orientation and acceleration of the drive component, cameras or other image sensors, ultrasonic sensors to acoustically detect objects in the surroundings of the drive component, lidar sensors, radar sensors, etc. Some sensors, such as the wheel encoders may be unique to the drive component(s) 212. In some cases, the sensor(s) on the drive component(s) 212 may overlap or supplement corresponding systems of the vehicle 202 (e.g., sensor(s) 206).

The drive component(s) 212 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive component(s) 212 may include a drive component controller which may receive and preprocess data from the sensor(s) and to control operation of the various vehicle systems. In some instances, the drive component controller may include one or more processors and memory communicatively coupled with the one or more processors. The memory may store one or more components to perform various functionalities of the drive component(s) 212. Furthermore, the drive component(s) 212 may also include one or more communication connection(s) that enable communication by the respective drive component with one or more other local or remote computing device(s).

The vehicle computing device(s) 204 may include processor(s) 218 and memory 220 communicatively coupled with the one or more processors 218. Memory 220 may represent memory 108. Computing device(s) 214 may also include processor(s) 222, and/or memory 224. The processor(s) 218 and/or 222 may be any suitable processor capable of executing instructions to process data and perform operations as described herein. By way of example and not limitation, the processor(s) 218 and/or 222 may comprise one or more central processing units (CPUs), graphics processing units (GPUs), tensor processing units (TPUs), integrated circuits (e.g., application-specific integrated circuits (ASICs)), gate arrays (e.g., field-programmable gate arrays (FPGAs)), and/or any other device or portion of a device that processes electronic data to transform that electronic data into other electronic data that may be stored in registers and/or memory.

Memory 220 and/or 224 may be examples of non-transitory computer-readable media. The memory 220 and/or 224 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory 220 and/or memory 224 may store a localization component 226, perception component 228, prediction component 230, planning component 232, architecture 234, map data 236, training data 238, and/or system controller(s) 240—zero or more portions of any of which may be hardware, such as GPU(s), CPU(s), and/or other processing units. Perception component 228 may represent perception component 110, prediction component 230 may represent prediction component 112, planning component 232 may represent planning component 114, architecture 234 may represent architecture 120, map data 236 may represent map data 118, and/or system controller(s) 240 may represent controller(s) 116.

In at least one example, the localization component 226 may include hardware and/or software to receive data from the sensor(s) 206 to determine a position, velocity, and/or orientation of the vehicle 202 (e.g., one or more of an x-, y-, z-position, roll, pitch, or yaw). For example, the localization component 226 may include and/or request/receive map(s) of an environment, such as map data 236, and can continuously determine a location, velocity, and/or orientation of the autonomous vehicle within the map(s). In some instances, the localization component 226 may utilize SLAM (simultaneous localization and mapping), CLAMS (calibration, localization and mapping, simultaneously), relative SLAM, bundle adjustment, non-linear least squares optimization, and/or the like to receive image data, lidar data, radar data, IMU data, GPS data, wheel encoder data, and the like to accurately determine a location, pose, and/or velocity of the autonomous vehicle. In some examples, the localization component 226 may determine localization and/or mapping data comprising a pose graph (e.g., a sequence of position(s) and/or orientation(s) (i.e., pose(s)) of the vehicle 202 in space and/or time, factors identifying attributes of the relations therebetween, and/or trajectories of the vehicle for accomplishing those pose(s)), pose data, environment map including a detected static object and/or its distance from a pose of the vehicle 202, and/or the like In some instances, the localization component 226 may provide data to various components of the vehicle 202 to determine an initial position of an autonomous vehicle for generating a trajectory and/or for generating map data. In some examples, localization component 226 may provide, to the perception component 228, prediction component 230, and/or architecture 234 a location and/or orientation of the vehicle 202 relative to the environment and/or sensor data associated therewith.

In some instances, perception component 228 may comprise a primary perception system and/or a prediction system implemented in hardware and/or software. The perception component 228 may detect object(s) in in an environment surrounding the vehicle 202 (e.g., identify that an object exists), classify the object(s) (e.g., determine an object type associated with a detected object), segment sensor data and/or other representations of the environment (e.g., identify a portion of the sensor data and/or representation of the environment as being associated with a detected object and/or an object type), determine characteristics associated with an object (e.g., a track identifying current, predicted, and/or previous position, heading, velocity, acceleration, and/or other state associated with an object), and/or the like. The perception component 228 may include a prediction component that predicts actions/states of dynamic components of the environment, such as moving objects, although the prediction component may be separate, as in the illustration. In some examples, the perception component 228 may determine a top-down representation of the environment that encodes the position(s), orientation(s), velocity (ies), acceleration(s), and/or other states of the objects, map data, and/or general environment state data for the environment. For example, the top-down representation may be an image with additional data embedded therein, such as where various pixel channel values encode the perception data and/or map data discussed herein. Data determined by the perception component 228 is referred to as perception data.

The prediction component 230 may predict a future state of an object in the environment surrounding the vehicle 202. In some examples, the prediction component 230 may include the architecture 234, although in additional or alternate examples the architecture 234 may be separate component. The future (predicted) state may include a set of paths predicted by architecture 234 for an object, which may indicate a predicted object series of or continuous indication of position and/or orientation of the object. Data determined by the prediction component 230 is referred to as prediction data. In some examples, the prediction component 230 may determine a top-down representation of a predicted future state of the environment. For example, the top-down representation may be an image with additional data embedded therein, such as where various channel pixel values encode the prediction data discussed herein.

The planning component 232 may receive a location and/or orientation of the vehicle 202 from the localization component 226 and/or perception data from the perception component 228 (including a set of paths determined by architecture 234) and may determine instructions for controlling operation of the vehicle 202 based at least in part on any of this data. In some examples, the memory 220 may further store map data 236 and this map data may be retrieved by the planning component 232 as part of generating the top-down representation of the environment discussed herein. In some examples, determining the instructions may be based at least in part on a format associated with a system with which the instructions are associated (e.g., first instructions for controlling motion of the autonomous vehicle may be formatted in a first format of messages and/or signals (e.g., analog, digital, pneumatic, kinematic, such as may be generated by system controller(s) of the drive component(s) 212) that the drive component(s) 212 may parse/cause to be carried out, second instructions for the emitter(s) 208 may be formatted according to a second format associated therewith). In some examples, where the planning component 232 may comprise hardware/software-in-a-loop in a simulation (e.g., for testing and/or training the planning component 232), the planning component 232 may generate instructions which may be used to control a simulated vehicle. These instructions may additionally or alternatively be used to control motion of a real-world version of the vehicle 202, e.g., in instances where the vehicle 202 runs the simulation runs on vehicle during operation.

In some examples, the map data 236 may comprise a two-dimensional or three-dimensional representation of the environment, characteristic(s) associated therewith, and/or embedding(s). A two-dimensional representation may include, for example, a top-down representation of the environment and a three-dimensional representation may comprise position, orientation, and/or geometric data (e.g., a polygon representation, a digital wire mesh representation). Either representation may comprise a label associated with a portion of the top-down representation indicating different characteristic(s) and/or feature(s) of the environment, such as the existence and/or classification of a static object (e.g., signage, mailboxes, plants, poles, buildings, and/or the like); areas of the environment relevant to the vehicle's operations (e.g., crosswalks, drivable surfaces/roadways, turning lanes, controlled intersections, uncontrolled intersections, sidewalks, passenger pickup/drop-off zones, and/or the like); a rule of the road associated with a portion of the map data; conditional lighting data depending on the time of day/year and/or the existence and location of light sources; object characteristics (e.g., material, refraction coefficient, opacity, friction coefficient, elasticity, malleability); occlusion data indicating portion(s) of the environment that are occluded to one or more sensors of the vehicle 202; and/or the like. The occlusion data may further indicate occlusions to different classes of sensors, such as portion(s) of the environment occluded to visible light cameras but not to radar or lidar, for example. The two-dimensional representation and/or three-dimensional representation may have embeddings associated therewith that encode this data via the learned process discussed herein. For example, for a three-dimensional representation of the environment comprising a mesh, an embedding may be associated with a vertex of the mesh that encodes data associated with a face that may be generated based on one or more vertices associated with the face. For a two-dimensional representation of the environment an edge or other portion of the top-down representation may be associated with an embedding.

The memory 220 and/or 224 may additionally or alternatively store a mapping system, a planning system, a ride management system, simulation/prediction component, etc.

As described herein, the localization component 226, the perception component 228, the prediction component 230, the planning component 232, architecture 234, and/or other components of the system 200 may comprise one or more ML models. For example, localization component 226, the perception component 228, the prediction component 230, the planning component 232, and/or the architecture 234 may each comprise different ML model pipelines. In some examples, an ML model may comprise a neural network. An exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine-learning, which can refer to a broad class of such algorithms in which an output is generated based on learned parameters.

Figure 3:
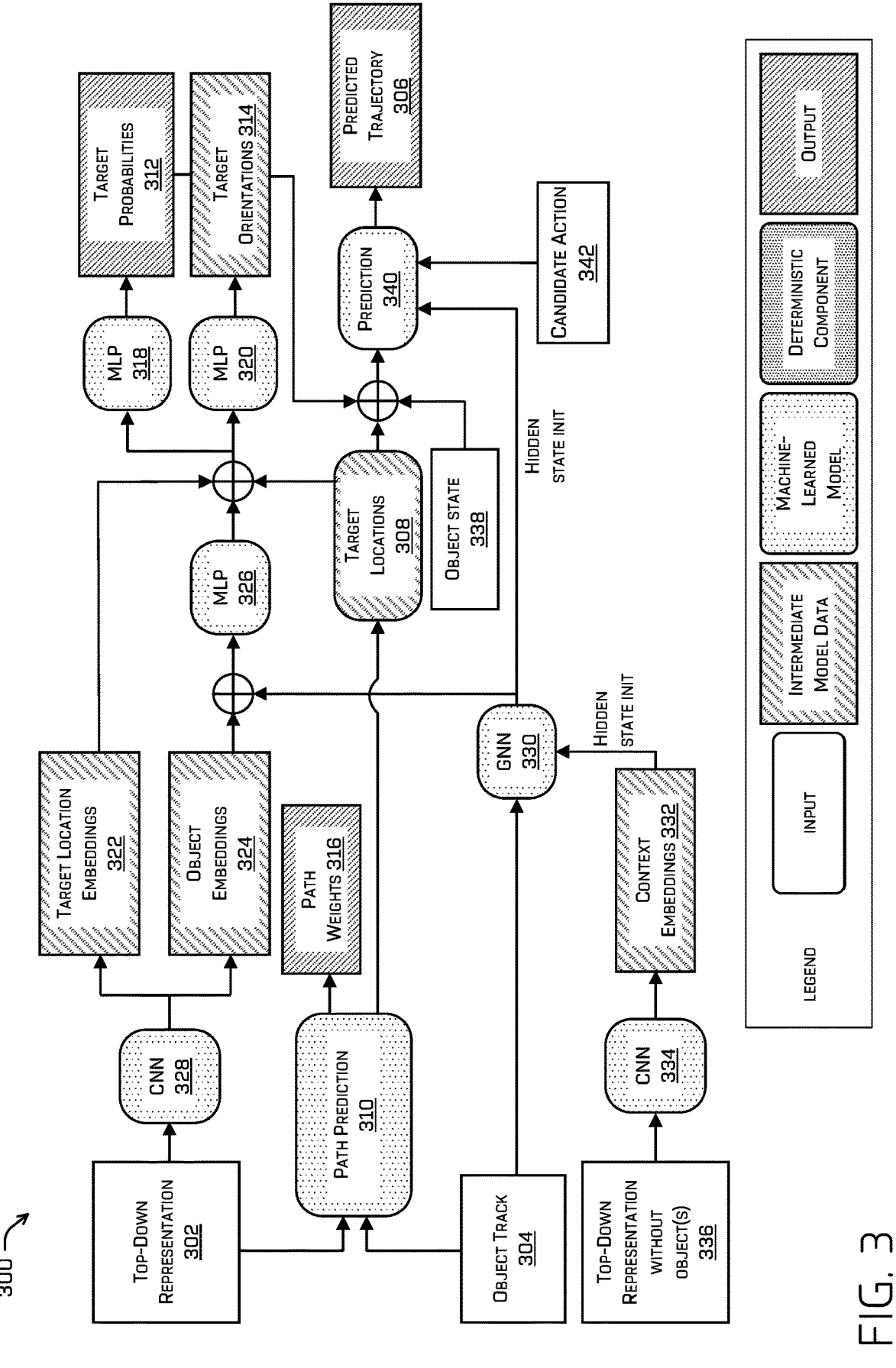
FIG. 3 illustrates a block diagram of an example architecture for predicting time-invariant object paths and using those paths to determine a predicted object trajectory.
Figure 4:
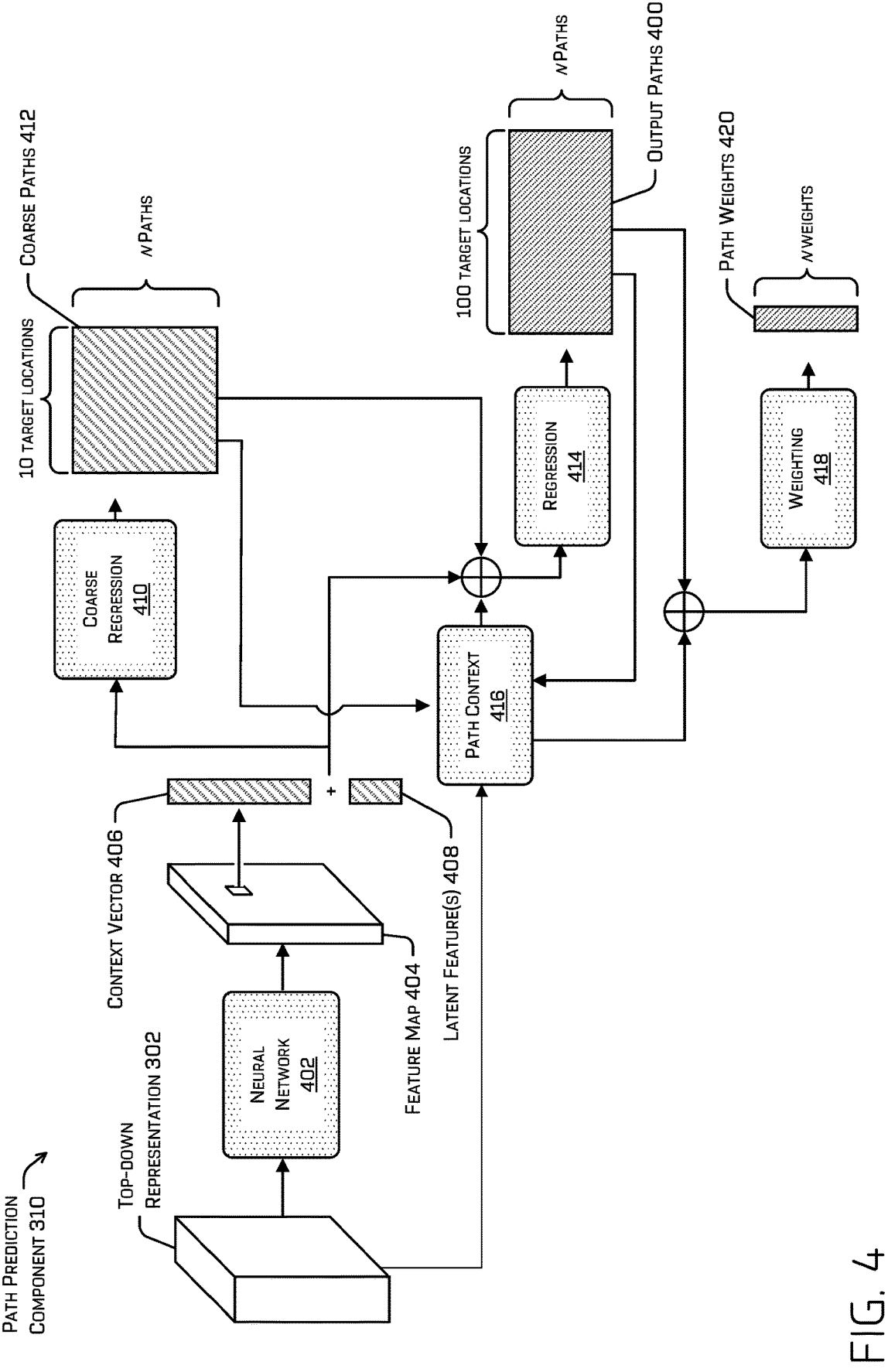
FIG. 4 illustrates a block diagram of an example architecture for predicting time-invariant object paths.
Figure 5:
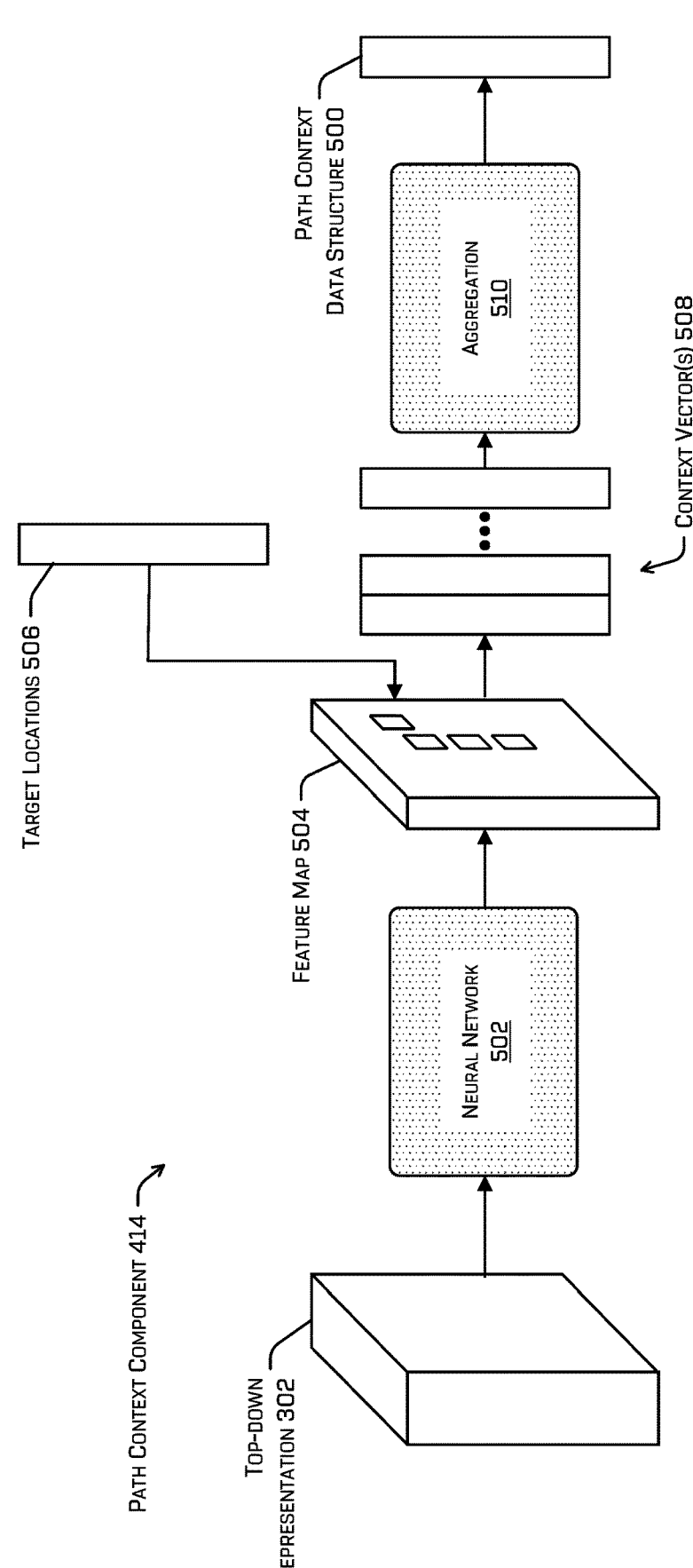
FIG. 5 illustrates a block diagram of an example architecture for determining path context as part of predicting time-invariant object paths.

In some examples, the architecture 234 may comprise machine-learned model components, such as those discussed in FIGS. 3-5, for determining a set of diverse time-invariant paths predicting potential future positions and/or orientations of an object. The architecture 234 may comprise one or more different types of machine-learned model components are part of the architecture 234, as discussed further herein. The architecture 234 or the planning component 232 may comprise additional or alternate machine-learned model components for determining a predicted trajectory (that may be time-variant) for an object that may be determined based at least in part on one or up to all of the set of paths determined by the architecture 234, a right-of-way determination for the object, lane(s) determined to be associated with the object based at least in part on one or up to all of the set of paths determined by the architecture 234, or the like, as discussed further herein.

Figure 6:
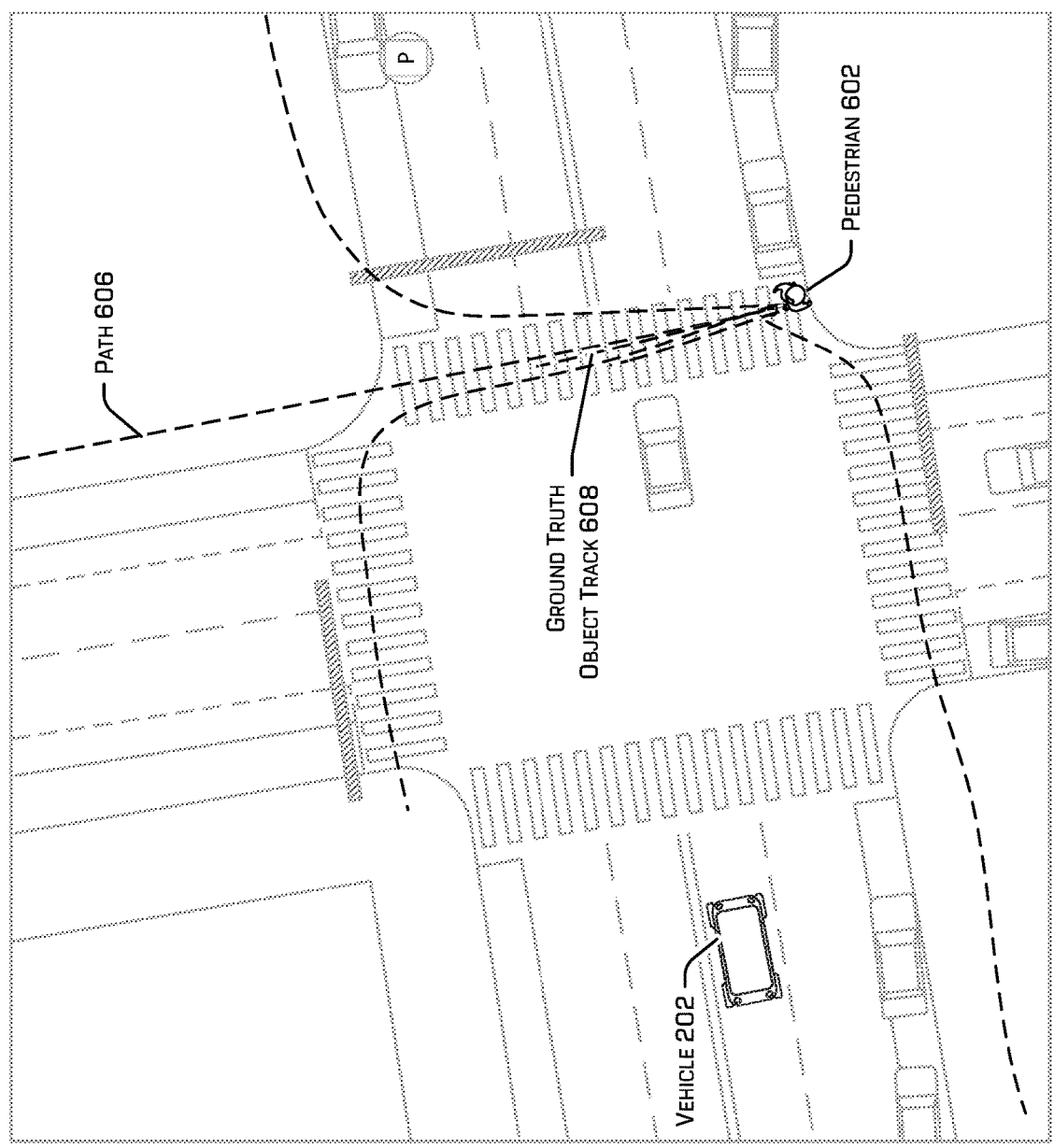
FIG. 6 illustrates an example top-down view of a scenario for which diverse time-invariant paths have been predicted for a pedestrian.
Figure 7:
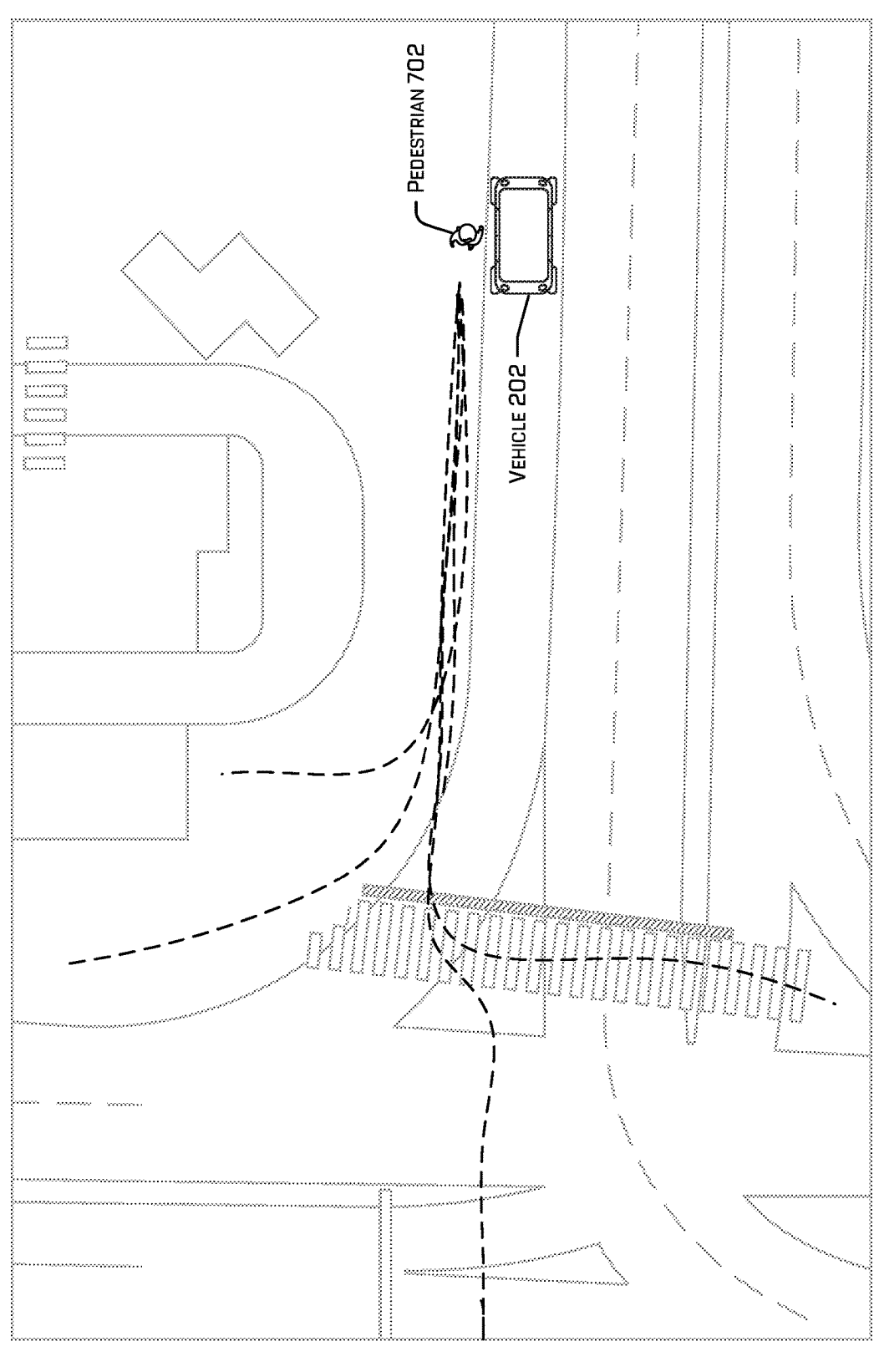
FIG. 7 illustrates an example top-down view of a scenario for which diverse time-invariant paths have been predicted for a pedestrian.

In some examples, the architecture 234 may be trained at computing device(s) 214 based at least in part on training data 238. FIGS. 6 and 7 illustrate examples of such training data. The training data 238 may comprise sensor data and/or perception data that composes a ground truth object track indicating a position and/or orientation of an object over time and may comprise hundreds or thousands of object tracks that may be used for training the architecture 234. For example, the training data 238 may be amalgamated from sensor data collected by and/or perception data generated by the vehicle 202 and/or one or more other vehicles for objects encounter by those vehicle(s). During training, the original sensor data may be provided as input to the architecture 234 discussed herein and the architecture 234 may be trained based at least in part on a loss based on a difference between the ground truth object track associated with the object and a path generated by the architecture 234. Note that the ground truth object track wouldn't be available to the vehicle 202 during inference and would just be part of training. The ground truth object track would have been generated by a vehicle at a time later than the time at which the sensor data was collected. To promote spatial diversity between the paths in the set of paths determined by the architecture 234, instead of determining differences between the ground truth object track and each of the paths in the set of paths, the only the closest path in the set of paths to the ground truth object track is used to determine the difference (and the corresponding loss). By not using the other (more spatially distant) tracks as part of the loss determination, the other paths in the set wouldn't be suppressed by the training.

In some examples, the loss may include an L1 loss, L2 loss, Huber loss, square root of the mean squared error, Cauchy loss, or another loss function and may be determined based on a difference between the closest path to the ground truth object track and that loss may be backpropagated through the component(s) of the architecture 234 discussed herein. This means that parameter(s) of any of the components of the architecture 234 may be altered (using gradient descent) to reduce this loss such that, if the architecture 234 repeated the process on the same input data, the resultant loss would be less than it was on the last run. This process may be repeated for multiple iterations of data, known as a training dataset. For example, the training may comprise altering one or more weights and/or biases and/or other parameter(s) of the component(s) of the architecture 234. In some examples, some component(s) of the architecture 234 may be trained separately, such as the predicted trajectory component.

Training the architecture 234 to determine a mixture model may comprise determining a distribution associated with a location and/or orientation indicated by a ground truth object tracking using a heuristic (set) variance or determining the variance based at least in part on confidence score(s) determined by a perception component as part of determining the ground truth object track. In such an example, during training, instead of using the original position and/or orientation indicated by a ground truth object track, the techniques may include sampling a new mean or sampling a location and/or orientation from the distribution to use to determine the loss.

Any type of machine-learning can be used consistent with this disclosure. For example, machine-learning models can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet-50, ResNet-101, VGG, DenseNet, PointNet, Xception, ConvNeXt, U-Net, EfficientDet, and the like; visual transformer(s) (ViT(s)), such as a bidirectional encoder from image transformers (BEIT), visual bidirectional encoder from transformers (VisualBERT), image generative pre-trained transformer (Image GPT), data-efficient image transformers (DeiT), deeper vision transformer (DeepViT), convolutional vision transformer (CvT), detection transformer (DETR), Miti-DETR, or the like; and/or general or natural language processing transformers, such as BERT, GPT, GPT-2, GPT-3, or the like. In some examples, the ML model discussed herein may comprise PointPillars, SECOND, top-down feature layers (e.g., see U.S. Pat. No. 10,649,459, filed Apr. 26, 2018, which is incorporated by reference in its entirety herein for all purposes), and/or VoxelNet. Architecture latency optimizations may include MobilenetV2, Shufflenet, Channelnet, Peleenet, and/or the like. The ML model may comprise a residual block such as Pixor, in some examples.

Memory 220 may additionally or alternatively store one or more system controller(s) 240 (which may be a portion of the drive component(s)), which may be configured to control steering, propulsion, braking, safety, emitters, communication, and other systems of the vehicle 202. These system controller(s) may communicate with and/or control corresponding systems of the drive component(s) 212 and/or other components of the vehicle 202. For example, the planning component 232 may generate instructions based at least in part on perception data generated by the perception component 228, prediction component 230 and/or architecture 234 and transmit the instructions to the system controller(s) 240, which may control operation of the vehicle 202 based at least in part on the instructions.

It should be noted that while FIG. 2 is illustrated as a distributed system, in alternative examples, components of the vehicle 202 may be associated with the computing device(s) 214 and/or components of the computing device(s) 214 may be associated with the vehicle 202. That is, the vehicle 202 may perform one or more of the functions associated with the computing device(s) 214, and vice versa.

Example Machine-Learned Architecture for Generating Diverse Time-Invariant Object Path Predictions FIG. 3 illustrates a block diagram of an example architecture 300 for predicting time-invariant object paths for an object. The object may have been detected by a perception component of a vehicle and attendant data related thereto may have been generated by the perception component, such as a top-down representation 302 of the environment and/or a track 304 associated with the object. The example architecture 300 further comprises components for determining a predicted trajectory 306 or multiple predicted trajectories from the set of paths generated by the example architecture 300. One of these predicted trajectories may indicate a series of position(s) and/or orientation(s) that the object may take over time. The example architecture may represent architecture 234.

The example architecture 300 may determine a set of paths, each of which may indicate a subset of target locations 308. One of these paths may indicate a continuous representation (e.g., a curve, line) or a set of locations indicating positions along a path that the object may occupy in the future, although no specific time is associated with any of the locations. For example, the target locations 308 may indicate an x-,y-position; x-,y-position; an angle (e.g., where each target location is equally spaced/indicates an equal displacement from a last target location an angle at which the next location lies may be used); coefficients of a polynomial and/or degree of the polynomial (e.g., to indicate a continuous representation of the position; and/or the like. Additionally or alternatively, the path prediction component 310 may determine an orientation (e.g., by an additional output head of the path prediction component 310) associated with each target location, although the illustrated example depicts a different example where a separate component of the example architecture 300 determines the orientations. In a non-limiting example of a set of target locations, the path prediction component 310 may determine 100 locations for 100 meters of displacement of the vehicle. In other words, for the example given above, each target location may be placed 1 meter from the last location. In a non-limiting example of a continuous representation, the path prediction component may determine a principal component analysis representation of the paths and determine weights for components thereof to determine a continuous paths. A location may be a position in or portion of the environment, such as a cell in a grid overlaying a top-down representation of the environment. A path prediction component 310 of the architecture may be trained to determine, as part of one of the paths of the set of paths, the target locations 308 based at least in part on a top-down representation 302 of the environment and/or an object track 304 determined for the object for which the set of paths is being determined. Each path of the set of paths may be indicated by a subset of the target locations. The target locations 308 for a path may indicate a series or set of locations in the environment and/or a continuous location, such as may be indicated by a line or curve. In some examples, the target locations 308 may have a constant arclength or displacement between each other, collectively extending from a current position of the object.

A path may further comprise target probabilities 312 and/or target orientations 314, as discussed further below. In sum, then, a path may comprise target locations (or a subset thereof as discussed further below), target probabilities, and/or target orientations. In other words, a path may indicate position(s) and/or orientation(s) that an object may occupy along with probability (ies) that the object will occupy those position(s) and/or orientation(s).

In some examples, the top-down representation may include a data structure, such as an image, where each pixel is associated with one or more channels indicating different characteristics of the environment, such as object detection data, map data, general environment data, and/or the like. For example, instead of indicating color data, a pixel of the top-down representation may indicate object data, map data, and/or general environment data, each of which may be associated with one or more channels of the image. Additionally or alternatively, the top-down representation may indicate such data as a vector, tensor, or matrix (e.g., where a first portion of the vector indicates a location in the environment and a second portion associated with the first portion indicates any object data, map data, and/or general environment data associated with that location). The object data indicated in the top-down representation 302 may comprise object detection data associated with the object and/or any other objects that have been detected by the perception component, along with their attendant data, such as confidence score(s) (e.g., posterior probability (ies) indicating an estimate of the accuracy of the data with which a posterior probability is associated), object classification (e.g., pedestrian, cyclist, vehicle, construction zone, static (immovable)/dynamic (movable) object), velocity, acceleration, orientation, and/or the like. In some examples, the general environment data indicated in the top-down representation 302 may comprise dynamic map data (e.g., a traffic light state, a stop/go state at a construction site, the existence of a construction region), weather conditions, and/or the like. Using the top-down representation 302 as part of the input to the path prediction component 310 allows the target locations 308 determined by the path prediction component 310 to be conditioned on the various data indicated in the top-down representation 302, which could include things like the existence of other objects, lane locations, lane directionality, and/or the like. In some examples, the top-down representation 302 may comprise multiple top-down representations associated with multiple times, such as a current time and up to k time steps into the past.

In some examples, the object track 304 may indicate historical and/or current object data associated with the object for which the set of paths is being predicted by the path prediction component 310. For example, the object track 304 may indicate historical and/or current object position, orientation, velocity, acceleration, classification, and/or other state of that object (e.g., door/aperture state, turning state, intent state such as activation turn signal).

The path prediction component 310 may additionally or alternatively determine path weights 316 associated with the set of paths. For example, the path prediction model may one path weight associated with one of the paths of the set of paths. The weight may be a confidence score, such as a likelihood (e.g., posterior probability) that the vehicle will take a particular path. In some examples, the path weights 316 may be used to filter the paths generated by the path prediction component 310 to determine a set number of paths to output or to output those paths associated with a path weight that meets or exceeds a path weight threshold. For example, each path may have a path weight generated therefor and the path prediction component 310 may output the top n number of paths by path weight output by the path prediction component 310 (where n is a positive integer, e.g., 3, 5, any other positive integer) or the path prediction component 310 may output the paths that have a path weight that meets or exceeds a threshold path weight. For example and without limitation, if the path weights are numbers between 0 and 1, the path weight threshold could be 0.7, 0.8, or 0.9, although any other threshold could be used that suitably filters out low confidence paths. Although in an additional or alternate example, all the paths determined by the path prediction model may be used or a low path weight threshold could be used (e.g., 0.1, 0.2, 0.3, or the like where the path weights are a number between 0 and 1) in order to promote and/or retain the diversity of the paths output by the path prediction component 310.

Further details regarding the architecture and operations of the path prediction component 310 are discussed in FIG. 4.

The target locations 308 may be used to determine target probabilities 312 and/or target orientations 314. The target orientations 314 may indicate an orientation (e.g., yaw, pitch, and/or roll, but at least a yaw) of the object associated with each of the target locations 308. The target probabilities 312 may comprise a probability distribution over the target locations 308, indicating a probability for each target location, or a mixture model (e.g., a Gaussian mixture model (GMM)) comprising a probability distribution (e.g., Gaussian distribution, Poisson distribution) for each location of the target locations. In the latter example, each Gaussian may be defined by a mean, standard deviation or variance, and/or a component weight, as part of the GMM. Accordingly, a path of the set of paths may comprise a probability distribution over the target locations or a GMM over the target locations where each target location is associated with a probability distribution within the GMM and a component weight. In addition to or instead of determining the target location(s), the path prediction component 310 may determine longitudinal progress in space for the object (e.g., via a line, curve, polynomial) and a GMM over a discretization of such a path.

In some examples, a multi-layer perceptron 318 (MLP) (or another suitable type of machine-learned model) may determine the target probabilities 312 and a multi-layer perceptron 320 (or another suitable type of machine-learned model) may determine the target orientations 314. The multi-layer perceptron 318 may determine the target probabilities 312 for a set of target locations (and a corresponding path) based at least in part on target location embeddings 322, an intermediate output determined by multi-layer perceptron 326, and the target locations 308.

A convolutional neural network 328 (CNN) (or another suitable type of machine-learned model) may determine the target location embeddings 322 based at least in part on the target locations 308. For example, once the target locations 308 have been generated, the convolutional neural network 328 may determine embeddings for top-down representation data associated with each of the target locations. The convolutional neural network 328 may use an exact corresponding location in the top-down representation 302 or a region around the location to determine an embedding from the top-down representation that is associated with a target location. An embedding may be a high-dimensional vector or tensor that represents the input data in an embedding space where distance in the embedding space represents similarity between input data—the more distant two embeddings are in the embedding space, the less similar the corresponding input data. The convolutional neural network 328 may encode a portion of the top-down representation as a target location embedding in association with one of the target locations 308.

To determine the intermediate output, the convolutional neural network 328 may determine object embeddings 324 associated with the target locations 308 and/or the object itself. For example, the convolutional neural network 328 may determine an embedding associated with a portion of the top-down representation that is associated with any objects identified in the top-down representation 302 that are also associated with one of the target locations 308 or with the object for which the set of paths is being generated. Then, to determine the intermediate output, the zero or more object embeddings 324 may concatenated with an output from a graph neural network 330 (or another suitable type of machine-learned model).

The output from the graph neural network 330 may be based at least in part on the object track 304 and context embedding(s) 332. Context embedding(s) 332 may be determined by a convolutional neural network 334 based at least in part on a top-down representation of the environment without any object detection data included therein, i.e., top-down representation 336. For example, the context embedding(s) 332 may be determined based at least in part on map data and/or other environment state data at an object's current location and/or for any of the target locations 308, thereby providing context for those locations.

The output from the graph neural network 330 may be concatenated to the object embeddings 324 and used by the multi-layer perceptron 326 to determine an intermediate output that may be concatenated with the target location embeddings 322 and the target locations 308 to form inputs to the multi-layer perceptron 318 and the multi-layer perceptron 320.

The target probabilities 312 determined by the multi-layer perceptron 318 may be used to reduce the number of target locations 308 for a path down to a subset of target locations 308, although in additional or alternate examples, all the target locations may be used as part of a path. In an example where the target locations 308 are filtered using the target probabilities 312, the architecture 300 may determine the subset of target locations by determining a top p number of target locations (where p is a positive integer), as ranked by probability indicated in the probability distribution or by component weight indicated in the mixture model, or by determining those target locations associated with a probability or component weight that meet or exceed a threshold probability or component weight, respectively.

The subset of target locations 308 (as filtered by target probabilities 312) or all of the target locations for a path may then be associated in a data structure with their respective target orientations 314 and an object state 338 may be concatenated thereto. In some examples, associating a respective target orientation to a target location may comprise determining the target location for which a target orientation was generated and associating the two, such as via associating the target location and the target orientation in a data structure (e.g., by occupying a same row of a data structure). The architecture 300 may then repeat this process for as many paths exist in the set of paths. For example, if there are five paths in the set of paths, there would be five sets of targets locations or five subsets of target locations (filtered by their respective target probabilities 312), five sets of target orientations associated therewith, and a single object state 338 concatenated to the five sets.

The object state 338 may indicate current object detection data associated with the object for which the set of paths are being generated. For example, the object state 338 may indicate a current position, orientation, velocity, acceleration, classification, state, and/or the like of the object for which the set of paths was generated.

The target locations or subset of target locations, target orientations, and object state may then be used for the techniques discussed herein as one path of the set of time-invariant paths associated with the object. For example, a path may be provided as input to a prediction component 340 to determine a predicted trajectory 306. Although the prediction component 340 may be trained and/or operated in a variety of manners, the prediction component 340 is configured to determine time(s) at which an object will reach target locations along a path. In other words, the prediction component 340 does not need to determine a spatial component for where the object will be—that is defined by the target locations 308. Instead, the prediction component 340 conditions its output based on the target locations 308 and determines a series of times at which the object is predicted to reach the target locations (or subset of target locations, as discussed further below). These times may then be associated with the path as a predicted trajectory that indicates progress in time along a path. In some examples, the prediction component 340 may additionally or alternatively determine a confidence score (e.g., a posterior probability/likelihood) associated with the predicted trajectory. Using a mixture model as the target probabilities 312 provided to the prediction component 340 may improve the accuracy of this confidence score in indicating the likelihood of an object to take a particular path and/or to reach a particular location along the path at a particular time. In some examples, the prediction component 340 may additionally or alternatively determine a confidence score for each time-target location pair and may aggregate these confidence scores to determine a mean or median confidence score for the predicted trajectory.

Additionally or alternatively, the prediction component 340 may generate multiple predicted trajectories per path. In such an example, the prediction component 340 may determine different sets of timings along the path, resulting in trajectories that are the same spatially (they follow the same path) but reach different points along the path. Additionally or alternatively, the prediction component 340 use a path to determine multiple spatially and/or temporally diverse trajectories. In such an example, the prediction component 340 may received the top-down representation 302, object track 304, candidate action 342, object state 338, and a path as input and may determine one or more predicted trajectories.

Regardless of whether multiple predicted trajectories (whether temporally diverse or spatially and/or temporally diverse) are determined per path or only a single predicted trajectory is determined per path, the prediction component 340 may comprise a post-processing component that filters the predicted trajectories based at least in part on the confidence scores associated therewith and/or the spatial and/or temporal diversity associated therewith. For example, the post-processing component may suppress output of any predicted trajectories that have a confidence score below a threshold. Additionally or alternatively, the post-processing component may cluster predicted trajectories based at least in part on spatial distance (e.g., using k-means) and/or temporal variance and may determine, for each cluster, a representative predicted trajectory to output for each cluster. For example, the representative predicted trajectory may be determined based at least in part on the representative predicted trajectory being a medoid of the cluster and/or having a greatest confidence score from among the confidence scores associated with the predicted trajectories of the cluster. Additionally or alternatively, the relevance determination discussed herein may be used by the post-processing component to limit output to only those predicted trajectories that intersect a path or candidate action of the vehicle 202 or may add an indicator to such predicted trajectories in association with their output instead of suppressing other predicted trajectories. A combination of techniques may also be used. For example, all predicted trajectories that intersect a path or candidate action for controlling the vehicle, but any of the remaining predicted trajectories may be filtered using the techniques discussed above (e.g., determining a representative trajectory by clustering, confidence score filtering, and/or the like).

In some examples, the predicted trajectory may additionally or alternatively be indicated as Gaussian distribution(s) of times over the path where a Gaussian distribution is determined by the prediction component 340 based at least in part on a set of predicted trajectories determined by the prediction component 340. For example, if the prediction component 340 determines multiple (temporally or temporally and/or spatially diverse) predicted trajectories per path, the prediction component 340 may determine a spatial and/or temporal Gaussian distribution based at least in part on those predicted trajectories. Additionally or alternatively, instead of determining the multiple predicted trajectories, the prediction component 340 may determine a Gaussian distribution (e.g., a mean and variance) in space and/or time (depending on whether the predicted trajectories are to vary in time alone or both time and space) based at least in part on a path. Regardless, the planning component may then randomly sample the Gaussian distribution as part of the tree search to determine a predicted trajectory of an object responsive to the candidate action 342.

In some examples, the prediction component 340 may additionally or alternatively receive an output from the graph neural network 330 that is based at least in part on the object track 304 and/or the context embeddings 332. In some examples, the prediction component 340 may be part of a tree search algorithm. For example, the prediction component 340 may additionally or alternatively receive a candidate action 342 for controlling the vehicle. The candidate action may indicate one of a number of different candidate actions for controlling the vehicle being tested by the tree search as a candidate for use by the vehicle. The tree search may iterate through testing different candidate actions and determining different predicted trajectories that may result from different candidate actions. For example, the object may react differently to the object taking different actions and this may be captured by using the candidate action 342 as part of determining the predicted trajectory 306 for the object. The tree search may then use the predicted trajectory 306 as part of determining a cost associated with the candidate action 342.

For example, the tree search may determine an action for the vehicle to carry out based at least in part on determining costs associated with different candidate actions and selecting one of the candidate actions based on a cost associated therewith from among the multiple candidate actions and their respective costs. For example, each of the different candidate actions may be individually scored using cost functions associated with different priorities for operating the vehicle, such as safety, comfort, progress, etc. The cost for a candidate action may be based at least in part on a likelihood of object impact, safety, vehicle progress along a route, passenger comfort, drive dynamics, and/or the like. Some of these costs may be based at least in part on the predicted trajectory 306. For example, a safety objective may be associated with multiple different sub-costs that may be based at least in part on the proximity to the object that a candidate action would bring the vehicle, minimum braking distance or maximum braking force to a nearest object, conformance to rules of the road, and/or the like, multiple of which may be based at least in part on the predicted trajectory 306. A passenger comfort objective may be associated with determining an acceleration or jerk associated with the candidate action and/or one or more lateral and/or longitudinal velocity, acceleration, and/or jerk thresholds. The cost may be based at least in part on the candidate action itself and/or the state indicated by a predicted state of the environment associated with a prediction node determined, in part, by the predicted trajectory 306.

In some examples, determining the predicted trajectory 306 may be based at least in part on all of the paths in the set of paths determined by the architecture 300 or a predicted trajectory may be determined for up to each path of the set of paths. In some examples, a path weight of the path weights 316 or the target probabilities 312 may be concatenated to the input provided to the prediction component 340, which may be used by the prediction component 340 as part of determining the predicted trajectory 306 or a set of predicted trajectories for the object. For example, the prediction component 340 may use a mixture model (e.g., the mean(s) and/or variance(s) indicated in the mixture model) associated with the target locations 308 (or subset of target locations) as part of determining the predicted trajectory 306. Additionally or alternatively, the path weight(s) or the target probabilities 312 may be associated with the predicted trajectory 306 after the predicted trajectory 306 has been generated. In this example, the tree search may use the path weight(s) or the target probabilities 312 as part of determining a cost associated with the candidate action 342.

In an additional or alternate example, the prediction component 340 may receive or determine a control profile for determining the predicted trajectory 306. For example, the prediction component 340 may receive a control profile that is determined based at least in part on an object track and/or object state (e.g., the perception component may additionally or alternatively classify an object as "assertive," "nominal," or "conservative," each of which may be associated with different control profiles) or may be trained to output a control profile. Either way, the control profile may be used to dictate the object's progress along one of the paths of the set of paths over time. For example, the control profile may indicate a velocity and/or acceleration profile indicating how quickly the object will accelerate over time, which may be used to determine the predicted trajectory 306.

Regardless of whether a control profile is used, the prediction component 340 may be trained to progress along one of the paths, i.e., when the vehicle will reach each of the target locations indicated by a path, allowing the prediction component 340 to specialize in determining progress along a path instead of also needing to determine where the object will be and how the object is oriented. In other words, the techniques discussed herein break progress in time and the spatial location and orientation of an object into two separate parts.

Example Path Prediction Component Architecture

FIG. 4 illustrates a block diagram of an example architecture of the path prediction component 310 for determining a set of paths, i.e., output paths 400, each of which may comprise a set of target locations, such as target locations 308. To determine the output paths, a neural network 402 (or any other suitable machine-learned model, such as a graph neural network) may use the top-down representation 302 to determine a feature map 404. In some examples, the object track 304 may be part of the top-down representation 302 if the top-down representation 302 comprises multiple top-down representations from a current time to k time steps in the past, although in an additional or alternate example, the neural network 402 may use both the top-down representation 302 and an object track to determine the feature map 404. In some examples, the feature map 404 may comprise a number of channels that indicate a reduced feature set that is based at least in part on the top-down representation 302. A first portion of the feature map and a first portion of the top-down representation 302 may both be associated with a first portion of the environment. In some examples, the neural network 402 may be an image processing neural network, such as a ResNet, ConvNeXt, U-Net, or the like, although other machine-learned model types may be used, such as a transformer.

The path prediction component 310 may then determine a query vector for each portion of the feature map 404. The query vector may comprise a context vector 406 with latent feature(s) 408 concatenated thereto. The context vector 406 may be the feature map data associated with a portion of the feature map and the environment. The latent feature(s) 408 may indicate environmental features that aren't indicated in the top-down representation 302 that may be relevant to the object, such as a traffic light state of a traffic light that the object is facing, a construction worker stop/go indication, weather conditions, velocity of a detected object, and/or the like. Generally, the latent feature(s) 408 may include any data detected by the vehicle that isn't part of the top-down representation 302 that may be relevant to the object. It is understood that in additional or alternate examples, the top-down representation 302 may comprise this data and the latent feature(s) 408 may accordingly be unnecessary.

Regardless, query vectors generated from the feature map 404 may be provided as input to a coarse regression component 410. In examples where latent feature(s) are not appended to the context vectors, the feature map 404 may be provided as input to the coarse regression component 410. The coarse regression component 410 may be trained to output n coarse paths 412. These paths may be coarse in that they comprise less target locations than the paths that are finally output. For example, each coarse path may comprise q target locations, where q is a positive integer, or in a continuous representation coefficients and/or degree of a polynomial. Although FIG. 4 depicts q as being 10, q could be any number that is less than the number of target locations output by the regression component 414 for a particular path (i.e., 100 in the depicted example, although the number of target locations output by the regression component for a path could be any other number). In some examples, the coarse regression component 410 may comprise two output heads, one that outputs the coarse paths 412 and another that outputs orientations associated with the target locations (or discrete portions along a polynomial curve for a continuous representation of the predicted position of the object).

The coarse paths 412 may then be provided to a path context component 416 discussed in more detail regarding FIG. 5 that determines a path context data structure 500 for each coarse path. The path context data structure 500 and the coarse paths 412 may then be used by the regression component 414 to determine the output paths 400. In some examples, the regression component 414 may be trained to use the coarse paths 412 and/or path context data structure to determine refined paths as the output paths 400. For example, one of the output paths may comprise r target locations, where r is a positive integer greater than q, the number of target locations in a coarse path. In the illustrated example, r is 100, although r could be any other number greater than q. In an example where a continuous representation is used, the regression component 114 may determine a set of coefficients for a polynomial having a degree greater than a degree of the polynomial output by the coarse regression component 410 or the coarse regression polynomial may be used as an output path. In some examples, the regression component 414 may comprise two output heads, one that outputs the output paths 412 and another that outputs final orientations associated with the target locations of the output paths 400 (or discrete portions along a polynomial curve for a continuous representation of the predicted position of the object).

In some examples, the regression component 414 may additionally or alternatively use query vectors to determine the output paths 400, where the query vectors comprise the context vector(s) 406 and/or latent feature(s) 408 for each portion of the feature map 404 associated with the coarse paths 412.

Note that, as discussed above regarding FIG. 3, the number of target locations indicated in a path may be reduced to a subset of target locations after determining the target probabilities 312 associated with a path. For example, the architecture 300 may determine the subset of target locations by determining a top p number of target locations (where p is a positive integer), as ranked by probability indicated in the probability distribution or by component weight indicated in the mixture model, or by determining those target locations associated with a probability or component weight that meet or exceed a threshold probability or component weight, respectively. Moreover, the target locations indicated by one of the output paths 400 may be associated with the target orientations determined by multi-layer perceptron 318 for that path. In other words, a location indicated by a path may be augmented with a predicted orientation of the object at that location.

Once the output paths 400 have been generated, the output paths 400 may be provided to the path context component 416 to determine a second path context data structure for the refined paths. This second path context data structure and the output paths 400 may be used by a weighting component 418 to determine n path weights 420—one path weight per output path. Additionally or alternatively, the original path context data structure may be used by the weighting component 418 to determine the path weights 420 although the original path context data structure is generated for the coarse paths 412 and the accuracy of the path weights 420 may be increased by determining a second path context data structure for the output paths 400 that have been refined.

The path weights 420 may comprise a path weight that indicates a confidence score (e.g., a likelihood/posterior probability) that a respective path of the n paths will be taken by the object. In other words, the path weights 420 provide an overall indication of which path of the n paths the object is most likely to least likely to take. As discussed above, these path weights may be used by the tree search component as part of the cost determination and/or to filter the paths to reduce the number of paths and the amount of computational processing required to run the predictions in the tree search. For example, the path weights may be used to discard any path(s) that have a path weight that are below a lower bound path weight and/or to select for output any path(s) with a path weight that are at or above an upper bound path weight. Regardless, the target locations identified by one of the output paths 400 may represent target locations 308. Alternatively, the target locations 308 may represent all the target locations indicated by the output paths 400.

The coarse regression component 410, path context component 416, regression component 414, and weighting component 418 may all comprise machine-learned model(s) that may be trained as part of the training discussed herein. For example, the coarse regression component 410, the regression component 414, and the weighting component 418 may each comprise a different multi-layer perceptron, although additional or alternate types of machine-learned models may be used. The machine-learned component(s) of the path context component 416 are discussed in further detail regarding FIG. 5.

Example Path Context Component Architecture

FIG. 5 illustrates a block diagram of an example architecture of a path context component 416 for determining a path context data structure 500 as part of predicting time-invariant object paths. In some examples, the path context component 416 may determine a first path context data structure based at least in part on the coarse paths 412. This first path context data structure may be used by the regression component 414 as part of determining the output paths 400. The path context component 416 may additionally or alternatively determine a second path context data structure based at least in part on the output paths 400. This second path context data structure may be used by the weighting component 418 as part of determining the path weights 420.

To determine either path context data structure 500, the path context component 416 may comprise a neural network 502 (or another suitable type of machine-learned model) that determines a feature map 504 based at least in part on top-down representation 302. In some examples, the neural network 502 may have the same architecture as neural network 402, but may be tuned (e.g., regressed by gradient descent) during training separately from neural network 402. In other words, although neural network 502 and neural network 402 may have the same architecture, they may be treated as separate components during training and their parameters (e.g., weights, biases) may accordingly be different. Additionally or alternatively, even if the architectures are the same, hyperparameters of the neural network 402 and the neural network 502 may be the same or different. For example, they may have different receptive fields (e.g., neural network 402 may have a larger receptive feature to capture more global features), window sizes, and/or the like. In such examples, the feature map 504 would be different than feature map 404. In an additional or alternate example, the neural network 502 and the neural network 402 may be a same neural network, in which case the feature map 504 would be the same as feature map 404.

Regardless, the feature map 504 may be spatially associated with the environment such that a portion of the feature map 504 is associated with a corresponding portion of the environment. Portions of feature map 504 may be determined based at least in part on target locations 506 as context vector(s) 508. Determining a portion of the feature map to use as a context vector may be based on determining that the portion of the feature map and a target location of the target locations 506 are associated with a same portion of the environment. These portions of the feature map 504 are depicted as squares within the feature map 504. For the sake of simplicity, the target locations 506 may be the target locations 506 of one of the paths of the coarse paths 412 or the output paths 400. However, multiple sets of target locations 506 for up to all the n paths may be used to determine sets of context vector(s) 508. The context vector(s) 508 may indicate the data in the feature map 504 associated with the target locations 506.

An aggregation component 510 may use the context vector(s) 508 to determine the path context data structure 500. In some examples, the aggregation component 510 may comprise a machine-learned component, such as an encoder, and the path context data structure 500 may comprise an embedding or set of embeddings. In an additional or alternate example, the aggregation component 510 may comprise a transformer block that applies self-attention where each portion of the feature map is a token and self-attention is applied over each of them and the result may be aggregated by a max pooling function as the path context data structure 500. Additionally or alternatively, the transformer block may apply cross-attention between the feature map portion and object state data, where the object state data is used to determine query (ies) (e.g., embeddings) and the feature map portion(s) may be used as the key(s) and value(s). Additionally or alternatively cross-attention may be applied between the different context vectors. The result may be max pooled or softmaxed as the path context data structure 500. In an additional or alternate example, the aggregation component 510 may comprise a neural network and the path context data structure 500 may comprise a feature map. In an additional or alternate example, the aggregation component 510 may be a deterministic (non-machine-learned) component that determines the path context data structure 500 by amalgamating the context vector(s) 508, such as by concatenation, strided concatenation, averaging, or the like.

Example Scenarios and Sets of Time-Invariant Paths

FIGS. 6 and 7 illustrate example top-down views of two scenarios for which diverse time-invariant paths have been predicted for a pedestrian. The sets of time-invariant paths depicted in FIGS. 6 and 7 may be examples of the set of paths output by the architecture 300. Note that, although the paths are depicted as dashed lines, the paths may indicate discrete locations and/or orientations in the environment instead of or in addition to a continuous representation of predicted object position and/or orientation. Moreover, even though the line representations of the paths do not include object orientations, a path may identify a predicted orientation of an object at a target location along the path (i.e., via target orientations 314).

FIG. 6 illustrates an example top-down view of a scenario 600 for which a set of time-invariant paths have been predicted for a pedestrian 602. The vehicle 202 may be storing, configured with, and operating architecture 300, which may determine a set of time-invariant paths associated with the pedestrian 602 based at least in part on perception data received from a perception component of the vehicle, such as a top-down representation of the scenario 600, an object track associated with pedestrian 602, a current state of pedestrian 602, and/or any of the other attendant data discussed above. The set of time-invariant paths are indicated as dashed lines and include path 606. FIG. 6 illustrates the diversity of the time-invariant paths resulting from the training techniques and architecture discussed herein. Other path prediction techniques may result in paths that closely align in space with path 606, whereas the architecture discussed herein results in the diverse paths depicted. This may allow the predicted trajectory component to specialize in determining progress along a path instead of being a general component that determines both spatial location and time, further increasing the accuracy of the resultant predictions.

FIG. 6 also illustrates a ground truth object track 608 that may be used as part of training the architecture 300 discussed herein. In some examples, instead of determining a difference between all of the paths and the ground truth object track 608 and determining a loss based on those difference, only a difference between the nearest path to the ground truth object track (i.e., path 606) is determined. A loss may then be determined based on this difference and used to alter parameter(s) of any of the components of the architecture 300 discussed herein to reduce the loss using gradient descent. For scenario 600, this would reinforce the architecture 300's production of path 606 and wouldn't cause the other paths to collapse in spatially on path 606, i.e., by coming closer to path 606.

FIG. 7 illustrates example top-down view of another scenario 700 for which a set of time-invariant paths have been predicted for a pedestrian 702. The set of time-invariant paths are depicted as dashed lines. The vehicle 202 may be storing, configured with, and operating architecture 300, which may determine a set of time-invariant paths associated with the pedestrian 702 based at least in part on perception data received from a perception component of the vehicle.

Example Ground Truth Object Tracks and Training

Figure 8:
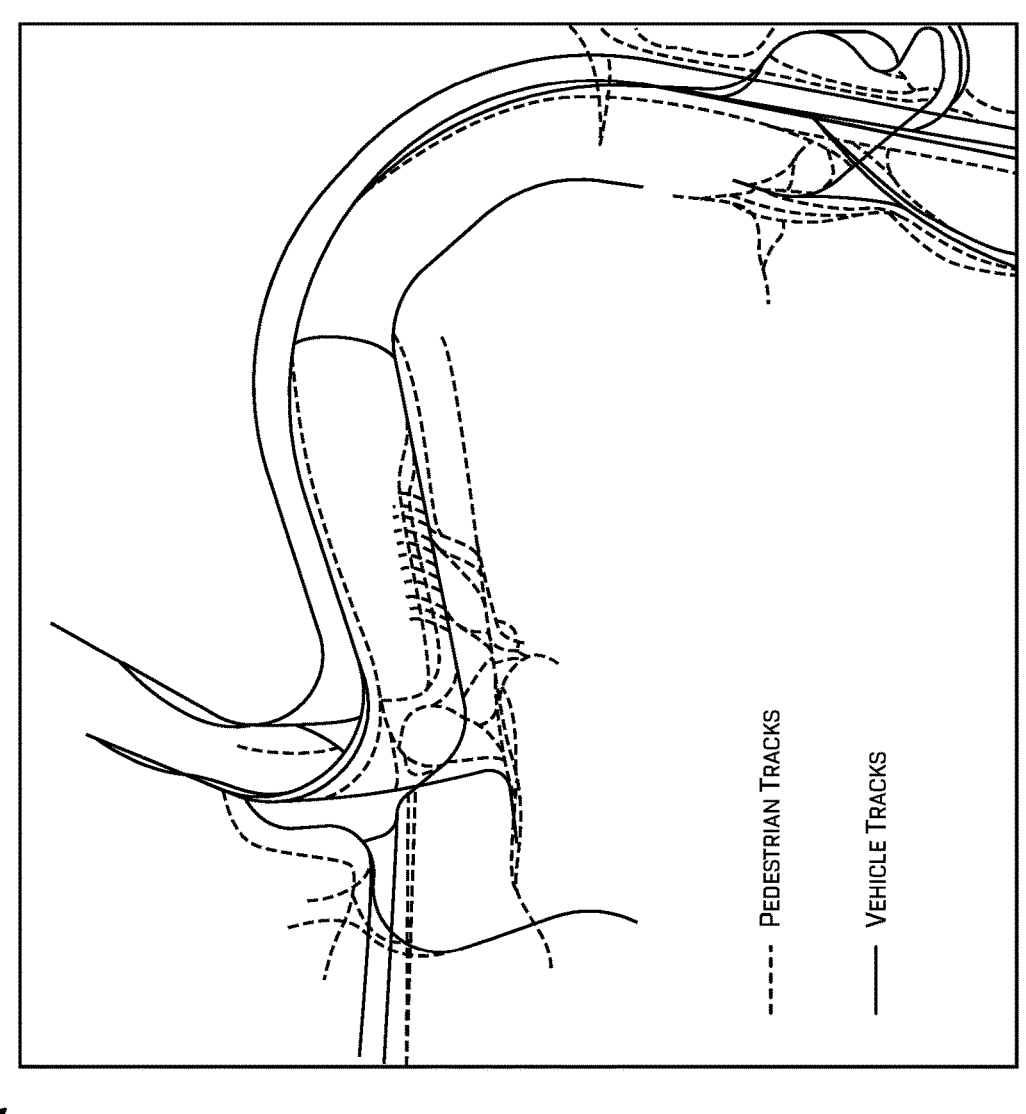
FIG. 8 illustrates example ground truth object tracks that may be determined from sensor data and used to train the machine-learned model architecture.

FIG. 8 illustrates example ground truth object tracks 800 that may be determined based at least in part on sensor data and used for training the architecture 300. Pedestrian tracks are illustrated in dashed lines and vehicle tracks are illustrated in solid lines. These tracks may have been generated by a perception component of one or more vehicles based at least in part on sensor data or by a remote computing device that receives sensor data from one or more vehicles. The tracks may indicate a position and/or orientation that a vehicle detected an object as occupying while the vehicle was operating and may be used as ground truth data for training the architecture 300. In some examples, a ground truth object track may be used based at least in part on determining that the ground truth object track is the nearest object track to a position and/or orientation of an object indicated in perception data used as part of the training.

Figure 9:
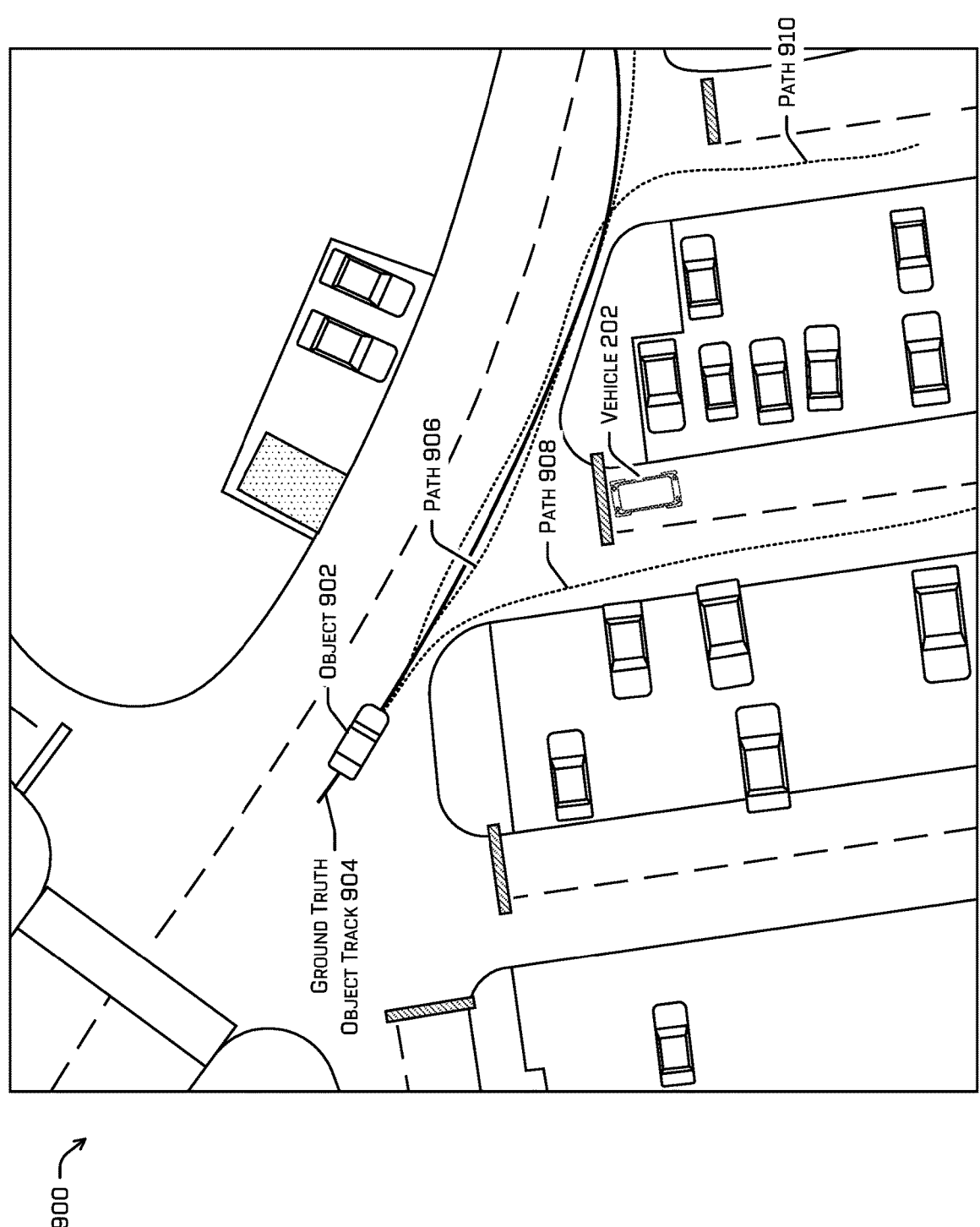
FIG. 9 illustrates an example top-down view of a scenario for which diverse time-invariant paths have been predicted for a vehicle and a ground truth object track that may be used to train the machine-learned model architecture.

FIG. 9 illustrates an example top-down view of a scenario 900 for which diverse time-invariant paths have been predicted for an object 902. FIG. 9 also illustrates a ground truth object track 904 (indicated as a bolded solid line) that may be used to train the machine-learned model architecture. In some examples, determining the ground truth object track 904 may include determining that the ground truth object track 904 is the closest ground truth object track to a position and/or orientation of the object 902 from among multiple ground truth object tracks for a same classification type as indicated by the object detection data (i.e., a vehicle in this case). As described above, a ground truth object track may be an object track previously generated by a vehicle or generated by a remote computing device based at least in part on sensor data received from a vehicle.

The paths generated by the architecture 300 may comprise path 906, path 908, and path 910. More or less paths could be generated by the architecture 300. Regardless, the training techniques discussed herein may comprise using a closest path to the ground truth object track to determine a loss for training the architecture 300. In the depicted example, path 906 may be the closest path to the ground truth object track 904. Determining the closest path to the ground truth object track 904 may comprise determining distances between the path and the ground truth object track 904 at regular intervals along the path and determining a total or average distance between the path and the ground truth object track 904. Whichever path has a smallest total or average distance may be used to regress parameter(s) of component(s) of the architecture 300 based at least in part on a loss determined based at least in part on the total, average, or other distance of the closest path.

Example Processes

FIG. 10 depicts a flow diagram of an example process 1000 for determining time-invariant paths predicting future position(s) and/or orientation(s) of an object and using those time-invariant paths to control a vehicle. Example process 1000 may be executed by a vehicle 202, such as by a perception component, prediction component, and/or planning component of the vehicle 202, as an example. At least part of the operations may be accomplished by the architecture 300.

At operation 1002, example process 1000 may comprise determining, based at least in part on sensor data, a top-down representation of the environment, according to any of the techniques discussed herein. In some examples, the top-down representation may be determined based at least in part on map data and/or object detection data. For example, object detection data may indicate a position, orientation, velocity (e.g., lateral, longitudinal, rotational, otherwise), acceleration (e.g., lateral, longitudinal, rotational, otherwise), an object classification (e.g., a type of object, such as public service object, vehicle, pedestrian, construction worker, etc.—one or more classifications may be associated with an object), sensor data segmentation (e.g., mask, instance segmentation, semantic segmentation), a region of interest (ROI) (e.g., a two- or three-dimensional bounding box, bounding region) identifying a portion of sensor data associated with the object, object state (e.g., passenger loading/unloading, signaling turn, green/red light, siren active/inactive, speaker active/inactive), and/or a confidence score indicating a likelihood (e.g., posterior probability) that any such data is correct/accurate (there may be confidence score generated for each in some examples).

The top-down representation may indicate detected object data and/or map data. A portion of the top-down representation, such as a pixel or group of pixels, may indicate object data and/or map data by one or more channels. For example, a pixel may have different channel(s) or subdivided channel(s) that indicate to different object data that may include a global location of the pixel (i.e., a location in the environment that the pixel is associated with), whether an object is detected as existing at the pixel location or a likelihood that an object exists at the pixel/environment location, an orientation of an object indicated as existing at the location, a velocity and/or acceleration of the object, a classification associated with an object, whether an object is static or dynamic, a track associated with the object, a signage state (e.g., red light, green light, lane unavailable, directionality of a lane), other object state (e.g., left turn signal on, vehicle left side door open), and/or the like. The top-down representation may additionally or alternatively include channel(s) indicating map data, such as the existence of a roadway, a type of roadway junction (e.g., four-way controlled intersection, T-junction uncontrolled, six-way light-controlled intersection), signage existence and/or type (e.g., yield sign, traffic control light), sidewalk existence, region of interest (e.g., construction zone, crosswalk, parking location, passenger pickup/drop-off location), and/or the like. In some examples, multiple versions of the top-down representation environment may be determined in association with different times. For example, a first top-down representation may be associated with a current environment state and/or one or more second top-down representations may be associated with previous environment state(s).

At operation 1004, example process 1000 may comprise receiving a track associated with an object, according to any of the techniques discussed herein. The track may be determined based at least in part on sensor data and may comprise current and/or historical object detection data or a subset thereof. For example, an object track may indicate a current and/or historical object position, orientation, classification, area occupied by the object, and/or the like.

At operation 1006, example process 1000 may comprise determining, by a first machine-learned model, a first predicted path and a second predicted path, according to any of the techniques discussed herein. In some examples, operation 1006 may comprise determining more than just two predicted paths. Operation 1006 may comprise determining a set of target locations by the path prediction component 310, the set of target locations comprising a first subset of target locations for the first predicted path and a second subset of target locations for the second predicted path. The paths generated at operation 1006 may lack an indication of time associated with the paths, i.e., the paths may be time-invariant. In some examples, operation 1006 may further comprise determining, by the path prediction component 310, a first path weight associated with the first path and a second path weight associated with the second path.

At operation 1008, example process 1000 may comprise determining, by a second machine-learned model, a set of likelihoods comprising a first subset of likelihoods that the object will occupy the first subset of target locations associated with the first predicted path and a second subset of likelihoods that the object will occupy the second subset of target locations associated with the second predicted path, according to any of the techniques discussed herein. Operation 1008 may comprise determining the target probabilities 312 by multi-layer perceptron 318. The target probabilities 312 may include a probability distribution over target locations or a mixture model (e.g., GMM) over the target locations. Operation 1008 may additionally or alternatively include determining a first set of target orientations associated with the first subset of target locations and a second set of target orientations associated with the second subset of target locations. In some examples, the second machine-learned model may be a second part of the first machine-learned model—i.e., the second machine-learned model and the first machine-learned model may be the same machine-learned model or two different machine-learned models.

At operation 1010, example process 1000 may comprise controlling a vehicle based at least in part on the set of likelihoods, the first predicted path, and the second predicted path, according to any of the techniques discussed herein. For example, operation 1010 may comprise determining one or more predicted trajectories based at least in part on the set of likelihoods and at least one of the first predicted path or the second predicted path. Operation 1010 may comprise determining a trajectory for the vehicle to implement based at least in part on the one or more predicted trajectories as part of a tree search algorithm (e.g., A*, D*, Djikstra's algorithm) that determines the trajectory. See U.S. patent application Ser. No. 18/084,419, filed Dec. 19, 2022, the entirety of which is incorporated by reference herein for all purposes. For example, a predicted trajectory generated from one or all of the predicted paths may be used to determine a cost associated with a candidate action for controlling the vehicle and a lowest cost candidate action may be selected as the trajectory for controlling the vehicle.

In some examples, determining a predicted trajectory may comprise determining, by a third machine-learned model and based at least in part on one of the predicted paths and the set of target probabilities associated therewith, times associated with target locations of the one of the predicted paths. For example, the third machine-learned model may determine a control profile defining a velocity and/or acceleration profile for progressing along the one of the predicted paths. Additionally or alternatively, the third machine-learned model may be trained to output a series of times in association with the target locations of the one of the predicted paths.

FIG. 11 depicts a flow diagram of an example process 1100 for determining time-invariant paths for an object and using those time-invariant paths to control a vehicle. Example process 1100 may be executed by a vehicle 202, such as by a perception component, prediction component, and/or planning component of the vehicle 202, as an example. At least part of the operations may be accomplished by the architecture 300. Example process 1100 may comprise one or more processes for using time-invariant paths for various operations on the vehicle, such as determining whether an object is relevant to vehicle operation planning, matching an object to one or more lanes, improving the predicted reaction of an object to a candidate action of the vehicle, determining a right-of-way of the vehicle and/or the object, and/or the like.

At operation 1102, example process 1100 may comprise determining, based at least in part on sensor data, object detection data associated with an object in an environment, according to any of the techniques discussed herein. The object detection data may comprise an object track and/or current object state. In some examples, operation 1102 may additionally or alternatively comprise determining a top-down representation of the environment.

At operation 1104, example process 1100 may comprise determining, by a machine-learned model, a first predicted path and a second predicted path, according to any of the techniques discussed herein. In some examples, operation 1004 may comprise determining more than just two predicted paths. Operation 1004 may comprise determining a set of target locations by the path prediction component 310, the set of target locations comprising a first subset of target locations for the first predicted path and a second subset of target locations for the second predicted path. The paths generated at operation 1004 may lack an indication of time associated with the paths, i.e., the paths may be time-invariant. In some examples, operation 1004 may further comprise determining, by the path prediction component 310, a first path weight associated with the first path and a second path weight associated with the second path.

At operation 1106, example process 1100 may comprise determining, based at least in part on the sensor data, a candidate trajectory for controlling the vehicle, according to any of the techniques discussed herein. For example, determining the candidate trajectory may be part of a tree search algorithm that tests different candidate trajectories for potential implementation by the vehicle. The candidate trajectory may indicate a position and/or orientation for the vehicle to occupy in the future and/or a velocity and/or acceleration for the vehicle as the vehicle reaches the position and/or orientation and/or for the vehicle to achieve by the time the vehicle reaches the position and/or orientation.

At operation 1108, example process 1100 may comprise modifying the candidate trajectory as a planned trajectory based at least in part on at least one of the first predicted path or the second predicted path, according to any of the techniques discussed herein. Modifying the candidate trajectory may be based at least in part on one or more of the following operations that may use the first predicted path or the second predicted path. For example, the operations may comprise using the first predicted path and/or the second predicted path to determine a restricted region in which the planning component of the autonomous vehicle is barred from determining candidate actions, a time-variant predicted trajectory responsive to a candidate action of the vehicle, one or more lanes associated with a path of the object, a right-of-way of the vehicle and/or the object, and/or a classification of an object as being active (i.e., relevant to vehicle operation planning) or inactive.

In some examples, the planning component of a vehicle may use at least one of the paths of the set of paths to determine a restricted region in which the vehicle may not travel or plan any candidate actions. For example, if a perception component of the autonomous vehicle classifies the object as having the dynamic classification, "parking," the planning component may use a path generated for that object that overlaps one or more parking spaces to determine a region that includes the path that the planning component will exclude from consideration for planning an action of the vehicle. In some examples, the planning component may determine the region based at least in part on determining a region that would be occupied by the object if the object were to follow the path plus a lateral buffer distance (e.g., 1 meter, 2 meters). Additionally or alternatively, the planning component may determine that a path overlaps one or more parking spaces and may determine this region for exclusion based on this determination instead of or in addition to receiving a classification that the object is parking from the perception component. In some examples, the planning component may additionally or alternatively determine a region to exclude from the planning space using a path of the set of based at least in part on based at least in part on receiving an indication from the perception component that the object is acting erratically (e.g., swerving, accelerating and decelerating repeatedly, confidence score determined by the perception component for the object is below a threshold confidence score such as may be caused by the object moving forward and backward repeatedly), receiving a classification associated with the object indicating that the object is a construction vehicle or emergency services or law enforcement vehicle, or the like.

In an additional or alternate example, the planning component may determine a time-variant predicted trajectory responsive to a candidate action of the vehicle and based at least in part on one or more of the set of paths determined for the object. For example, the planning component may comprise a tree search algorithm that generates and/or tests different candidate trajectories for the vehicle and selects one of the candidate trajectories for execution by the vehicle as a planned trajectory. As part of this process, the planning component may determine a predicted trajectory of the object based at least in part on one of the candidate trajectories and one of the predicted paths of the set of paths generated for the object. A prediction component of the tree search may determine the predicted trajectory as a reaction or response of the object to the candidate trajectory. In some examples, determining the predicted trajectory based at least in part on the candidate trajectory and one of the paths of the set of paths may comprise determining, by a machine-learned model (e.g., prediction component 340), progress in time along the path.

This progress in time may be determined by any of a variety of techniques. For example, the prediction component 340 may output a time associated with up to each location of the target locations indicated by the path, the prediction component 340 may output a control profile for determining progress along the path, or the like. A control profile may indicate gain(s), velocity (ies), and/or acceleration(s) of the object along the path over time. The prediction component 340 may be trained to use the candidate trajectory as input and the training data for the prediction component 340 may include a pair of input data comprising a path and a trajectory the vehicle was controlled with and ground truth data indicating an object track. That object track may indicate where and when the object moved responsive to the vehicle's trajectory.

Since the techniques described herein separate predicting the spatial location of the object (by determining the set of paths discussed herein) and progress of the object in time along one or more of those paths, the techniques are able to more accurately predict an object's reaction to a candidate trajectory of the vehicle. Moreover, the techniques are also able to more accurately predict adversarial behavior of the object, such as moving out-of-turn, making an illegal maneuver, executing a U-turn, or the like since the spatial diversity of the set of paths may capture such behavior, even though it may be somewhat unlikely to occur.

Operation 1108 may additionally or alternatively include determining one or more lanes associated with a path of the object. For example, this may include determining a lane or series of lanes that a path is collocated within based at least in part on map data. In some examples, matching an object path to one or more lanes may be used as part of determining a candidate action for the vehicle, selecting a planned trajectory for the vehicle to execute, determining a right-of-way level of priority for the object, and/or determining whether the object is relevant to vehicle operation planning.

Operation 1108 may additionally or alternatively include determining a right-of-way of a detected object and/or of the vehicle. Determining the right-of-way may comprise determining that a path of a set of paths determined for the detected object intersects a planned path or candidate action of the vehicle. In some examples, instead of determining whether an object path and a vehicle path or candidate action intersect, the techniques may include determining whether the object lane and a lane associated with the vehicle path or candidate action are the same lane or are two lanes that intersect, such as at a junction or intersection. Determining that two lanes intersect may comprise determining an extrapolation for both lanes and determining whether the extrapolations intersect. Regardless, the techniques may then determine a location associated with the intersection of the vehicle path and the object path or of the vehicle lane and the object lane and may determine, based at least in part on map data, rules of the road applicable to the location. For example, if the location is in the middle of a stop sign controlled intersection, the map data may indicate that the location is associated with rules-of-the road related to passing through a stop sign controlled intersection (e.g., which may define which entity should go through the intersection first depending on the time at which the entity arrived at a stop line and/or the entity's relative placement in the intersection relative to another entity that is stopped or travelling through the intersection). In some examples, the relevant rule of the road may additionally or alternatively be based on a state of another detected object in the environment such as a traffic control device (e.g., a stoplight), a current location of the object, a current location of the vehicle, or any of the locations along the path of the object or the vehicle. This method is advantageous because the paths discussed herein do not include time variance and, accordingly, there is no need to predict exactly where an object will be in the future.

Operation 1108 may additionally or alternatively include determining whether an object is relevant to operations of the vehicle and classifying the object as active (i.e., relevant) or inactive (i.e., irrelevant). For example, some objects may not be relevant to operations of the vehicle, such as by heading away from the vehicle or a path of the vehicle or lacking an intent to move in such a manner. In some examples, predicting motion of an object may differ depending on whether the object was classified as active or inactive. Motion of inactive objects may be predicted by a kinematics model or a neural network that doesn't use a candidate action of the vehicle as input; whereas, motion of active objects may be predicted by a machine-learned model that uses a candidate action of the vehicle as input and that may require more computing resources as the machine-learned model may be more complex and/or may use additional data as compared to the kinematics model or neural network used for inactive objects. For example, the machine-learned model for predicting active object motion and/or state(s) may use a top-down representation of the environment (which may embed object detection, map, and/or environment state data), object detection data (e.g., object track, object classification, object state), vehicle path, vehicle candidate trajectory, and/or the like to determine an active predicted trajectory. Whereas a kinematic model may use current and/or historical motion of the object alone, confined by some map features or the neural network may use the object track and a more rudimentary environment representation.

Classifying an object as an active object may comprise determining that at least one path of the set of objects determined for the object intersects a planned path or candidate action of the vehicle. Additionally or alternatively, classifying the object as an active object may comprise determining that a lane matched to a path predicted for the object is a same lane as a lane occupied by the vehicle, a lane associated with a path of the vehicle, or intersects a lane associated with a path of the vehicle. In an example where multiple objects have been detected and a set of paths have been determined for each object, the vehicle may filter out any objects that do not have any paths or lanes that intersect with the planned path or lane(s) associated with the vehicle. Classifying an object as an active object may further comprise determining a location at which the object path and the vehicle path/candidate action intersect and determining a first time window that the object may reach the location and a second time window that the vehicle may reach the location. If the first time window and second window overlap, the object may be classified as an active object; otherwise, if the first time window and the second window do not overlap, the object may be classified as an inactive object.

In some examples, determining the first time window for the object path may be based at least in part on the location and an estimated upper bound acceleration and a lower bound acceleration that the object may exert. In some examples, the upper bound acceleration and/or lower bound acceleration may be determined by current object data detected by the vehicle and/or historical object data. In an additional or alternate example, a machine-learned model may determine the upper bound acceleration and/or lower bound acceleration based at least in part on an object track (e.g., current and/or historical object detection data) and/or environment state data. Additionally or alternatively, this machine-learned model may determine a confidence score associated with the upper bound acceleration and/or lower bound acceleration that indicates the probability that the upper bound acceleration and/or lower bound acceleration are accurate.

In some examples, determining the second time window for the vehicle may be based at least in part on a candidate action for controlling the vehicle that may specify a position, heading, velocity, and/or acceleration for the vehicle to achieve by the time it reaches the location plus and/or minus a time constant to account for potential variations from the candidate action.

Accordingly, modifying the (first) candidate trajectory as a planned trajectory may comprise determining a second candidate trajectory that is associated with a lower cost than the first candidate trajectory. For example, the tree search may determine a first cost associated with the first candidate trajectory and a second cost associated with the second candidate trajectory. These costs may be determined based at least in part on cost functions associated with different priorities for operating the vehicle, such as safety, comfort, progress, etc. These cost functions may determine sub-costs that are summed as a total cost associated with a candidate action and may be based at least in part on a respective right-of-way of the object versus the vehicle (e.g., the cost for a candidate action causing the vehicle to move first may be increased if the object has a right-of-way priority over the vehicle), safety of the candidate trajectory in view of a predicted trajectory determined for the object (e.g., how close the candidate trajectory would bring the vehicle to the object, how hard the object or the vehicle are predicted to need to brake to avoid each other if the candidate trajectory is implemented, a lateral and/or longitudinal acceleration associated with the candidate action), a path weight associated with an adversarial path of the object meeting or exceeding a threshold path weight, and/or the like. As a result of determining the first cost and the second cost, operation 1108 may additionally or alternatively determine that the second cost is lower than the first cost and may, accordingly, select the second candidate trajectory for execution by the vehicle as the planned trajectory.

Additionally or alternatively, the tree search may determine different predicted trajectories associated for an object using different control profiles for the object. For example, a machine-learned model may determine the control profile or multiple control profiles or heuristic control profiles may be used (e.g., a heuristic control profile may be associated with assertive/aggressive accelerations and top speeds, nominal accelerations and top speeds, conservative accelerations and top speeds, or the like). A machine-learned model may additionally or alternatively determine confidence scores associated with the different control profiles (whether a machine-learned control profile or a heuristic control profile). The planning component may use all the control profiles or the top control profile or top n control profiles by confidence score to determine different predicted trajectories for an object. A control profile may define object progress along one of the paths and may indicate maximum and/or minimum speeds, longitudinal acceleration and/or deceleration, lateral acceleration and/or deceleration, gain(s), and/or the like. In some examples, if the tree search generated multiple predicted trajectories using multiple control profiles, the tree search may determine a cost for each resultant scenario and how the object may interact with a candidate trajectory for controlling the vehicle. In such an example, the tree search may amalgamate the costs as a total cost for scoring the candidate trajectory. For example, amalgamating the costs may include determining a greatest cost from among the costs, determining an average cost of the costs, or determining a weighted average cost of the costs, where a weight of the weighted average cost may be determined based at least in part on the confidence score associated with a particular control profile.

At operation 1110, example process 1100 may comprise controlling the vehicle based at least in part on the planned trajectory, according to any of the techniques discussed herein. For example, operation 1110 may comprise transmitting the planned trajectory to controller(s) of the vehicle for the controller(s) to actuate component(s) of the vehicle to execute the planned trajectory.

Example Clauses

A: A system comprising: one or more processors; and non-transitory memory storing processor-executable instructions that, when executed by the one or more processors, cause the system to perform operations comprising: determining, based at least in part on sensor data, a top-down representation of an environment in which a vehicle is operating, the top-down representation including a detection of an object in the environment; receiving a track associated with the object indicating a historical at least one of position, orientation, velocity, or acceleration of the object; determining, by a first machine-learned model and based at least in part on the top-down representation and the track, a set of target locations comprising a first subset of target locations associated with a first predicted path of the object and a second subset of target locations associated with a second predicted path, wherein the first predicted path and the second predicted path are time-invariant; determining, by a second machine-learned model based at least in part on the set of target locations, a set of likelihoods comprising a first subset of likelihoods that the object will occupy the first subset of target locations and a second subset of likelihoods that the object will occupy the second subset of target locations; and controlling the vehicle based at least in part on the set of likelihoods, the first predicted path, and the second predicted path.

B: The system of paragraph A, wherein the operations further comprise: determining, by a third machine-learned model based at least in part on the first subset of likelihoods, the first predicted path, a current object state, and the track, a first predicted trajectory associated with the object, the first predicted trajectory comprising a first time at which the object is predicted to occupy a first location along the first predicted path; and determining, based at least in part on the second subset of likelihoods, the second predicted path, a current object state, and the track, a second predicted trajectory associated with the object, the second predicted trajectory identifying a second time at which the object is predicted to occupy a second location along the second predicted path, wherein controlling the vehicle comprises controlling the vehicle based at least in part on the first predicted trajectory and the second predicted trajectory.

C: The system of either paragraph A or B, wherein the set of likelihoods are part of a probability distribution or a mixture model and determining the set of target locations by the first machine-learned model comprises: determining, by the second machine-learned model, the probability distribution over a superset of locations comprising the set of target locations or the mixture model over the superset; and determining the set of target locations based at least in part on determining, as the set of target locations, a top n locations of the superset ranked by probability indicated in the probability distribution or by component weight in the mixture model.

D: The system of any one of paragraphs A-C, wherein determining the set of likelihoods is further based at least in part on at least one of a set of location embeddings or an object embedding associated with the object determined by a third machine-learned model based at least in part on the top-down representation.

E: The system of any one of paragraphs A-D, wherein determining the set of target locations comprises: determining, by a first subcomponent of the first machine-learned model based at least in part on the top-down representation, a first intermediate output comprising a context vector associated with a first target location along the first predicted path; combining a latent feature vector with the context vector as a query vector, the latent feature vector identifying one or more characteristics of at least one of the environment or the object; determining, by a second subcomponent of the first machine-learned model based at least in part on the query vector, a set of coarse paths associated with the object; determining, by a third subcomponent of the first machine-learned model based at least in part on the query vector and a first portion of the top-down representation, a set of refined paths comprising a superset of locations that comprise the set of target locations, wherein the first portion of the top-down representation is determined based at least in part on the set of coarse paths; determining, by a fourth subcomponent of the first machine-learned model based at least in part on the set of refined paths and a second portion of the top-down representation, a set of scores associated with the set of refined paths, wherein the second portion of the top-down representation is determined based at least in part on the set of refined paths and wherein determining the set of target locations is based at least in part on the set of scores.

F: The system of any one of paragraphs A-E, wherein training the first machine-learned model and the second machine-learned model comprises: determining a first difference between a ground truth path that the object was observed as taking and the first predicted path; determining a second difference between the ground truth path and the second predicted path; determining that the first difference is less than the second difference; and altering a parameter of at least one of the first machine-learned model or the second machine-learned model to reduce the first difference and exclude the second difference from training.

G: One or more non-transitory computer-readable media storing processor-executable instructions that, when executed by one or more processors, perform operations comprising: determining, based at least in part on sensor data, a top-down representation of an environment in which a vehicle is operating, the top-down representation including a detection of an object in the environment; receiving a track associated with the object indicating a historical at least one of position, orientation, velocity, or acceleration of the object; determining, by a first machine-learned model and based at least in part on the top-down representation and the track, a first predicted path of the object and a second predicted path associated with the object; determining, by a second machine-learned model based at least in part on the first predicted path and the second predicted path, a set of likelihoods comprising a first subset of likelihoods associated with the first predicted path and a second subset of likelihoods associated with the second predicted path; and controlling the vehicle based at least in part on the set of likelihoods, the first predicted path, and the second predicted path.

H: The one or more non-transitory computer-readable media of paragraph G, wherein the operations further comprise: determining, by a third machine-learned model based at least in part on the first subset of likelihoods, the first predicted path, a current object state, and the track, a first predicted trajectory associated with the object, the first predicted trajectory comprising a first time at which the object is predicted to occupy a first location along the first predicted path; and determining, based at least in part on the second subset of likelihoods, the second predicted path, a current object state, and the track, a second predicted trajectory associated with the object, the second predicted trajectory identifying a second time at which the object is predicted to occupy a second location along the second predicted path, wherein controlling the vehicle comprises controlling the vehicle based at least in part on the first predicted trajectory and the second predicted trajectory.

I: The one or more non-transitory computer-readable media of either paragraph G or H, wherein: the set of likelihoods are part of a probability distribution or a mixture model; determining the first predicted path comprises determining a first subset of target locations; and determining the first subset of target locations by the first machine-learned model comprises: determining, by the second machine-learned model, the probability distribution over a superset of locations comprising the first subset of target locations or the mixture model over the superset; and determining the first subset of target locations based at least in part on determining, as the first subset of target locations, a top n locations of the superset ranked by probability indicated in the probability distribution or by component weight in the mixture model.

J: The one or more non-transitory computer-readable media of any one of paragraphs G-I, wherein determining the set of likelihoods is further based at least in part on at least one of a set of location embeddings or an object embedding associated with the object determined by a third machine-learned model based at least in part on the top-down representation.

K: The one or more non-transitory computer-readable media of paragraph J, wherein the operations further comprise determining, by a fourth machine-learned model based at least in part on the first predicted path, the set of location embeddings, and the object embedding, a predicted yaw of the object associated with a first location in the first predicted path, wherein the predicted yaw is included as part of the first predicted path.

L: The one or more non-transitory computer-readable media of any one of paragraphs G-K, wherein determining the first predicted path comprises: determining, by a first subcomponent of the first machine-learned model based at least in part on the top-down representation, a first intermediate output comprising a context vector associated with a first target location along the first predicted path; combining a latent feature vector with the context vector as a query vector, the latent feature vector identifying one or more characteristics of at least one of the environment or the object; determining, by a second subcomponent of the first machine-learned model based at least in part on the query vector, a set of coarse paths associated with the object;

determining, by a third subcomponent of the first machine-learned model based at least in part on the query vector and a first portion of the top-down representation, a set of refined paths comprising a set of locations that comprise a first subset of target locations associated with the first predicted path, wherein the first portion of the top-down representation is determined based at least in part on the set of coarse paths; determining, by a fourth subcomponent of the first machine-learned model based at least in part on the set of refined paths and a second portion of the top-down representation, a set of scores associated with the set of refined paths, wherein the second portion of the top-down representation is determined based at least in part on the set of refined paths and wherein determining the first predicted path is based at least in part on the set of scores.

M: The one or more non-transitory computer-readable media of any one of paragraphs G-L, wherein training the first machine-learned model and the second machine-learned model comprises: determining a first difference between a ground truth path that the object was observed as taking and the first predicted path; determining a second difference between the ground truth path and the second predicted path; determining that the first difference is less than the second difference; and altering a parameter of at least one of the first machine-learned model or the second machine-learned model to reduce the first difference and exclude the second difference from training.

N: A method comprising: determining, based at least in part on sensor data, a top-down representation of an environment in which a vehicle is operating, the top-down representation including a detection of an object in the environment; receiving a track associated with the object indicating a historical at least one of position, orientation, velocity, or acceleration of the object; determining, by a first machine-learned model and based at least in part on the top-down representation and the track, a first predicted path of the object and a second predicted path associated with the object; determining, by a second machine-learned model based at least in part on the first predicted path and the second predicted path, a set of likelihoods comprising a first subset of likelihoods associated with the first predicted path and a second subset of likelihoods associated with the second predicted path; and controlling the vehicle based at least in part on the set of likelihoods, the first predicted path, and the second predicted path.

O: The method of paragraph N, further comprising: determining, by a third machine-learned model based at least in part on the first subset of likelihoods, the first predicted path, a current object state, and the track, a first predicted trajectory associated with the object, the first predicted trajectory comprising a first time at which the object is predicted to occupy a first location along the first predicted path; and determining, based at least in part on the second subset of likelihoods, the second predicted path, a current object state, and the track, a second predicted trajectory associated with the object, the second predicted trajectory identifying a second time at which the object is predicted to occupy a second location along the second predicted path, wherein controlling the vehicle comprises controlling the vehicle based at least in part on the first predicted trajectory and the second predicted trajectory.

P: The method of either paragraph N or O, wherein: the set of likelihoods are part of a probability distribution or a mixture model; determining the first predicted path comprises determining a first subset of target locations; and determining the first subset of target locations by the first machine-learned model comprises: determining, by the second machine-learned model, the probability distribution over a superset of locations comprising the first subset of target locations or the mixture model over the superset; and determining the first subset of target locations based at least in part on determining, as the first subset of target locations, a top n locations of the superset ranked by probability indicated in the probability distribution or by component weight in the mixture model.

Q: The method of any one of paragraphs N-P, wherein determining the set of likelihoods is further based at least in part on at least one of a set of location embeddings or an object embedding associated with the object determined by a third machine-learned model based at least in part on the top-down representation.

R: The method of paragraph Q, further comprising determining, by a fourth machine-learned model based at least in part on the first predicted path, the set of location embeddings, and the object embedding, a predicted yaw of the object associated with a first location in the first predicted path, wherein the predicted yaw is included as part of the first predicted path.

S: The method of any one of paragraphs N-R, wherein determining the first predicted path comprises: determining, by a first subcomponent of the first machine-learned model based at least in part on the top-down representation, a first intermediate output comprising a context vector associated with a first target location along the first predicted path; combining a latent feature vector with the context vector as a query vector, the latent feature vector identifying one or more characteristics of at least one of the environment or the object; determining, by a second subcomponent of the first machine-learned model based at least in part on the query vector, a set of coarse paths associated with the object; determining, by a third subcomponent of the first machine-learned model based at least in part on the query vector and a first portion of the top-down representation, a set of refined paths comprising a set of locations that comprise a first subset of target locations associated with the first predicted path, wherein the first portion of the top-down representation is determined based at least in part on the set of coarse paths; determining, by a fourth subcomponent of the first machine-learned model based at least in part on the set of refined paths and a second portion of the top-down representation, a set of scores associated with the set of refined paths, wherein the second portion of the top-down representation is determined based at least in part on the set of refined paths and wherein determining the first predicted path is based at least in part on the set of scores.

T: The method of any one of paragraphs N-S, wherein training the first machine-learned model and the second machine-learned model comprises: determining a first difference between a ground truth path that the object was observed as taking and the first predicted path; determining a second difference between the ground truth path and the second predicted path; determining that the first difference is less than the second difference; and altering a parameter of at least one of the first machine-learned model or the second machine-learned model to reduce the first difference and exclude the second difference from training.

U: A system comprising: one or more processors; and non-transitory memory storing processor-executable instructions that, when executed by the one or more processors, cause the system to perform operations comprising: determining, based at least in part on sensor data, a top-down representation of an environment and object detection data associated with an object in the environment; determining, by a machine-learned model and based at least in part on the top-down representation and the object detection data, a first predicted path of the object and a second predicted path of the object, the first predicted path and the second predicted path being time-invariant and different; determining, based at least in part on the sensor data, a candidate trajectory for controlling a vehicle; modifying the candidate trajectory as a planned trajectory based at least in part on at least one of the first predicted path or the second predicted path; and controlling the vehicle based at least in part on the planned trajectory.

V: The system of paragraph U, wherein modifying the candidate trajectory is based at least in part on: determining a first location where the first predicted path and a portion of the candidate trajectory intersect; determining, based at least in part on the candidate trajectory, a first time window that the vehicle is predicted to arrive at the first location; determining, by a second machine-learned model based at least in part on the first predicted path, the top-down representation of the environment, and the object detection data, a second time window that the object is predicted to arrive at the first location; and determining that the first time window and the second time window overlap.

W: The system of either paragraph U or V, wherein the planned trajectory is a second candidate trajectory and modifying the candidate trajectory is based at least in part on determining a time-variant predicted path associated with the vehicle, wherein determining the time-variant predicted path is based at least in part on: determining, by a second machine-learned model based at least in part on the candidate trajectory, the top-down representation of the environment, and the object detection data, and at least one of the first predicted path or the second predicted path, an indication to use the first predicted path and first times at which the object is predicted to arrive at locations along the first predicted path; or determining, by a control profile indicating an acceleration curve, second times at which the object is predicted to arrive at the locations along the first predicted path.

X: The system of any one of paragraphs U-W, wherein determining the candidate trajectory or modifying the candidate trajectory is further based at least in part on determining a restricted region based at least in part on at least one of the first predicted path or the second predicted path, the restricted region indicating a region in which the vehicle is not permitted to travel.

Y: The system of any one of paragraphs U-X, wherein modifying the candidate trajectory is based at least in part on: determining a first location where the first predicted path and a portion of the candidate trajectory intersect; determining, based at least in part on map data associated with the first location, a rule of the road; and determining, based at least in part on the rule of the road, that the object has a right-of-way priority over the vehicle.

Z: The system of any one of paragraphs U-Y, wherein: modifying the candidate trajectory is based at least in part on determining a time-variant prediction for the object based at least in part on the first predicted path; determining the time-variant prediction comprises determining, by a control profile, times at which the object is predicted to arrive at locations along the first predicted path; and the control profile indicates at least one of a gain, acceleration profile, or velocity profile associated with controlling a simulated representation of the object to travel along the first predicted path.

AA: One or more non-transitory computer-readable media storing processor-executable instructions that, when executed by one or more processors, perform operations comprising: determining, based at least in part on sensor data, object detection data associated with an object in an environment; determining, by a machine-learned model and based at least in part on the object detection data, a first predicted path of the object and a second predicted path of the object, the first predicted path and the second predicted path being time invariant and different; determining, based at least in part on the sensor data, a candidate trajectory for controlling a vehicle; modifying the candidate trajectory as a planned trajectory based at least in part on at least one of the first predicted path or the second predicted path; and controlling the vehicle based at least in part on the planned trajectory.

AB: The one or more non-transitory computer-readable media of paragraph AA, wherein modifying the candidate trajectory is based at least in part on: determining, based at least in part on sensor data, a top-down representation of the environment; determining a first location where the first predicted path and a portion of the candidate trajectory intersect; determining, based at least in part on the candidate trajectory, a first time window that the vehicle is predicted to arrive at the first location; determining, by a second machine-learned model based at least in part on the first predicted path, the top-down representation of the environment, and the object detection data, a second time window that the object is predicted to arrive at the first location; and determining that the first time window and the second time window overlap.

AC: The one or more non-transitory computer-readable media of either paragraph AA or AB, wherein the planned trajectory is a second candidate trajectory and modifying the candidate trajectory is based at least in part on determining a time-variant predicted path associated with the vehicle, wherein determining the time-variant predicted path is based at least in part on: determining, based at least in part on sensor data, a top-down representation of the environment; determining, by a second machine-learned model based at least in part on the candidate trajectory, the top-down representation of the environment, and the object detection data, and at least one of the first predicted path or the second predicted path, an indication to use the first predicted path and first times at which the object is predicted to arrive at locations along the first predicted path; or determining, by a control profile indicating an acceleration curve, second times at which the object is predicted to arrive at the locations along the first predicted path.

AD: The one or more non-transitory computer-readable media of any one of paragraphs AA-AC, wherein determining the candidate trajectory or modifying the candidate trajectory is further based at least in part on determining a restricted region based at least in part on at least one of the first predicted path or the second predicted path, the restricted region indicating a region in which the vehicle is not permitted to travel.

AE: The one or more non-transitory computer-readable media of any one of paragraphs AA-AD, wherein modifying the candidate trajectory is based at least in part on: determining a first location where the first predicted path and a portion of the candidate trajectory intersect; determining, based at least in part on map data associated with the first location, a rule of the road; and determining, based at least in part on the rule of the road, that the object has a right-of-way priority over the vehicle.

AF: The one or more non-transitory computer-readable media of paragraph AE, wherein determining the first location further comprises determining, based at least in part on the first predicted path and the map data, a first lane associated with the first predicted path, wherein at least one of: determining that the first predicted path and the portion of the candidate trajectory further comprises determining that the first lane is a same lane associated with the candidate trajectory or an extrapolation of the first lane intersects the lane associated with the candidate trajectory; or determining the rule of the road is further based at least in part on the first lane.

AG: The one or more non-transitory computer-readable media of any one of paragraphs AA-AF, wherein: modifying the candidate trajectory is based at least in part on determining a time-variant prediction for the object based at least in part on the first predicted path; determining the time-variant prediction comprises determining, by a control profile, times at which the object is predicted to arrive at locations along the first predicted path; and the control profile indicates at least one of a gain, acceleration profile, or velocity profile associated with controlling a simulated representation of the object to travel along the first predicted path.

AH: The one or more non-transitory computer-readable media of any one of paragraphs AA-AG, wherein the candidate trajectory is a first candidate trajectory and modifying the candidate trajectory as the planned trajectory is based at least in part on: determining a time-variant prediction for the object based at least in part on the first predicted path; determining, based at least in part on the time-variant prediction, a first cost associated with the first candidate trajectory; determining a second candidate action; determining, based at least in part on the time-variant prediction, a second cost associated with the second candidate trajectory; and determining to use the second candidate trajectory as the planned trajectory based at least in part on determining that the second cost is less than the first cost.

AI: A method comprising: determining, based at least in part on sensor data, object detection data associated with an object in an environment; determining, by a machine-learned model and based at least in part on the object detection data, a first predicted path of the object and a second predicted path of the object, the first predicted path and the second predicted path being time invariant and different; determining, based at least in part on the sensor data, a candidate trajectory for controlling a vehicle; modifying the candidate trajectory as a planned trajectory based at least in part on at least one of the first predicted path or the second predicted path; and controlling the vehicle based at least in part on the planned trajectory.

AJ: The method of paragraph AI, wherein modifying the candidate trajectory is based at least in part on: determining, based at least in part on sensor data, a top-down representation of the environment; determining a first location where the first predicted path and a portion of the candidate trajectory intersect; determining, based at least in part on the candidate trajectory, a first time window that the vehicle is predicted to arrive at the first location; determining, by a second machine-learned model based at least in part on the first predicted path, the top-down representation of the environment, and the object detection data, a second time window that the object is predicted to arrive at the first location; and determining that the first time window and the second time window overlap.

AK: The method of either paragraph AI or AJ, wherein the planned trajectory is a second candidate trajectory and modifying the candidate trajectory is based at least in part on determining a time-variant predicted path associated with the vehicle, wherein determining the time-variant predicted path is based at least in part on: determining, based at least in part on sensor data, a top-down representation of the environment; determining, by a second machine-learned model based at least in part on the candidate trajectory, the top-down representation of the environment, and the object detection data, and at least one of the first predicted path or the second predicted path, an indication to use the first predicted path and first times at which the object is predicted to arrive at locations along the first predicted path; or determining, by a control profile indicating an acceleration curve, second times at which the object is predicted to arrive at the locations along the first predicted path.

AL: The method of any one of paragraphs AI-AK, wherein modifying the candidate trajectory is based at least in part on: determining a first location where the first predicted path and a portion of the candidate trajectory intersect; determining, based at least in part on map data associated with the first location, a rule of the road; and determining, based at least in part on the rule of the road, that the object has a right-of-way priority over the vehicle.

AM: The method of any one of paragraphs AI-AL, wherein: modifying the candidate trajectory is based at least in part on determining a time-variant prediction for the object based at least in part on the first predicted path; determining the time-variant prediction comprises determining, by a control profile, times at which the object is predicted to arrive at locations along the first predicted path; and the control profile indicates at least one of a gain, acceleration profile, or velocity profile associated with controlling a simulated representation of the object to travel along the first predicted path.

AN: The method of any one of paragraphs AI-AM, wherein the candidate trajectory is a first candidate trajectory and modifying the candidate trajectory as the planned trajectory is based at least in part on: determining a time-variant prediction for the object based at least in part on the first predicted path; determining, based at least in part on the time-variant prediction, a first cost associated with the first candidate trajectory; determining a second candidate action; determining, based at least in part on the time-variant prediction, a second cost associated with the second candidate trajectory; and determining to use the second candidate trajectory as the planned trajectory based at least in part on determining that the second cost is less than the first cost.

While the example clauses described above are described with respect to one particular implementation, it should be understood that, in the context of this document, the content of the example clauses can also be implemented via a method, device, system, computer-readable medium, and/or another implementation. Additionally, any of examples A-AN may be implemented alone or in combination with any other one or more of the examples A-AN.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code components and/or computer-executable instructions executed by one or more computers or processors, hardware, or some combination thereof. Some or all of the methods may alternatively be embodied in specialized computer hardware.

At least some of the processes discussed herein are illustrated as logical flow graphs, each operation of which represents a sequence of operations that can be implemented in hardware, software, or a combination thereof. In the context of software, the operations represent computer-executable instructions stored on one or more non-transitory computer-readable storage media that, when executed by one or more processors, cause a computer or autonomous vehicle to perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes. Such processes, or any portion thereof, may be performed iteratively in that any or all of the steps may be repeated. Of course, the disclosure is not meant to be so limiting and, as such, any process performed iteratively may comprise, in some examples, performance of the steps a single time.

Conditional language such as, among others, "may," "could," "may" or "might," unless specifically stated otherwise, are understood within the context to indicate that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a," "an" or other similar articles means singular and/or plural. When referring to a collection of items as a "set," it should be understood that the definition may include, but is not limited to, the common understanding of the term in mathematics to include any number of items including a null set (0), 1, 2, 3, . . . up to and including an infinite set.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art. Note that the term substantially may indicate a range. For example, substantially simultaneously may indicate that two activities occur within a time range of each other, substantially a same dimension may indicate that two elements have dimensions within a range of each other, and/or the like.

Many variations and modifications may be made to the above-described examples, the elements of which are to be understood as being among other acceptable examples. All such modifications and variations are intended to be included herein within the scope of this disclosure and protected by the following claims.

What is claimed is:

1. A system comprising:

one or more processors; and non-transitory memory storing processor-executable instructions that, when executed by the one or more processors, cause the system to perform operations comprising:

determining, based at least in part on sensor data, a top-down representation of an environment in which a vehicle is operating, the top-down representation including a detection of an object in the environment;

receiving a track associated with the object indicating a historical at least one of a historical position, a historical orientation, a historical velocity, or a historical acceleration of the object;

determining, by a first machine-learned model and based at least in part on the top- down representation and the track, a set of target locations comprising a first subset of target locations associated with a first predicted path of the object and a second subset of target locations associated with a second predicted path, wherein:

the first predicted path and the second predicted path are time-invariant, and the first predicted path being time-invariant is based at least in part on the first predicted path comprising a time-invariant series of object states, wherein an individual object state of the time-invariant series of object states is not associated with a specific time;

determining, by a second machine-learned model based at least in part on the set of target locations, a set of likelihoods comprising a first subset of likelihoods that the object will occupy the first subset of target locations and a second subset of likelihoods that the object will occupy the second subset of target locations; and controlling the vehicle based at least in part on the set of likelihoods, the first predicted path, and the second predicted path.

2. The system of claim 1, wherein the operations further comprise:

determining, by a third machine-learned model based at least in part on the first subset of likelihoods, the first predicted path, a current object state, and the track, a first predicted trajectory associated with the object, the first predicted trajectory comprising a first time at which the object is predicted to occupy a first location along the first predicted path; and determining, based at least in part on the second subset of likelihoods, the second predicted path, the current object state, and the track, a second predicted trajectory associated with the object, the second predicted trajectory identifying a second time at which the object is predicted to occupy a second location along the second predicted path, wherein controlling the vehicle comprises controlling the vehicle based at least in part on the first predicted trajectory and the second predicted trajectory.

3. The system of claim 1, wherein the set of likelihoods are part of a probability distribution or a mixture model and determining the set of target locations by the first machine-learned model comprises:

determining, by the second machine-learned model, the probability distribution over a superset of locations comprising the set of target locations or the mixture model over the superset; and determining the set of target locations based at least in part on determining, as the set of target locations, a top n locations of the superset ranked by probability indicated in the probability distribution or by component weight in the mixture model.

4. The system of claim 1, wherein determining the set of likelihoods is further based at least in part on at least one of a set of location embeddings or an object embedding associated with the object determined by a third machine-learned model based at least in part on the top-down representation.

5. The system of claim 1, wherein determining the set of target locations comprises:

determining, by a first subcomponent of the first machine-learned model based at least in part on the top-down representation, a first intermediate output comprising a context vector associated with a first target location along the first predicted path;

combining a latent feature vector with the context vector as a query vector, the latent feature vector identifying one or more characteristics of at least one of the environment or the object;

determining, by a second subcomponent of the first machine-learned model based at least in part on the query vector, a set of coarse paths associated with the object;

determining, by a third subcomponent of the first machine-learned model based at least in part on the query vector and a first portion of the top-down representation, a set of refined paths comprising a superset of locations that comprise the set of target locations, wherein the first portion of the top-down representation is determined based at least in part on the set of coarse paths;

determining, by a fourth subcomponent of the first machine-learned model based at least in part on the set of refined paths and a second portion of the top-down representation, a set of scores associated with the set of refined paths, wherein the second portion of the top-down representation is determined based at least in part on the set of refined paths; and wherein determining the set of target locations is based at least in part on the set of scores.

6. The system of claim 1, wherein training the first machine-learned model and the second machine-learned model comprises:

determining a first difference between a ground truth path that the object was observed as taking and the first predicted path;

determining a second difference between the ground truth path and the second predicted path;

determining that the first difference is less than the second difference; and altering a parameter of at least one of the first machine-learned model or the second machine-learned model to reduce the first difference and exclude the second difference from training.

7. One or more non-transitory computer-readable media storing processor-executable instructions that, when executed by one or more processors, perform operations comprising:

determining, based at least in part on sensor data, a top-down representation of an environment in which a vehicle is operating, the top-down representation including a detection of an object in the environment;

receiving a track associated with the object indicating at least one of a historical position, a historical orientation, a historical velocity, or a historical acceleration of the object;

determining, by a first machine-learned model and based at least in part on the top- down representation and the track, a first predicted path of the object and a second predicted path associated with the object, the first predicted path comprising a time-invariant series of object states, wherein an individual object state of the time-invariant series of object states is not associated with a specific time;

determining, by a second machine-learned model based at least in part on the first predicted path and the second predicted path, a set of likelihoods comprising a first subset of likelihoods associated with the first predicted path and a second subset of likelihoods associated with the second predicted path; and controlling the vehicle based at least in part on the set of likelihoods, the first predicted path, and the second predicted path.

8. The one or more non-transitory computer-readable media of claim 7, wherein the operations further comprise:

determining, by a third machine-learned model based at least in part on the first subset of likelihoods, the first predicted path, a current object state, and the track, a first predicted trajectory associated with the object, the first predicted trajectory comprising a first time at which the object is predicted to occupy a first location along the first predicted path; and determining, based at least in part on the second subset of likelihoods, the second predicted path, the current object state, and the track, a second predicted trajectory associated with the object, the second predicted trajectory identifying a second time at which the object is predicted to occupy a second location along the second predicted path, wherein controlling the vehicle comprises controlling the vehicle based at least in part on the first predicted trajectory and the second predicted trajectory.

9. The one or more non-transitory computer-readable media of claim 7, wherein:

the set of likelihoods are part of a probability distribution or a mixture model;

determining the first predicted path comprises determining a first subset of target locations; and determining the first subset of target locations by the first machine-learned model comprises:

determining, by the second machine-learned model, the probability distribution over a superset of locations comprising the first subset of target locations or the mixture model over the superset; and determining the first subset of target locations based at least in part on determining, as the first subset of target locations, a top n locations of the superset ranked by probability indicated in the probability distribution or by component weight in the mixture model.

10. The one or more non-transitory computer-readable media of claim 7, wherein determining the set of likelihoods is further based at least in part on at least one of a set of location embeddings or an object embedding associated with the object determined by a third machine-learned model based at least in part on the top-down representation.

11. The one or more non-transitory computer-readable media of claim 10, wherein the operations further comprise determining, by a fourth machine-learned model based at least in part on the first predicted path, the set of location embeddings, and the object embedding, a predicted yaw of the object associated with a first location in the first predicted path, wherein the predicted yaw is included as part of the first predicted path.

12. The one or more non-transitory computer-readable media of claim 7, wherein determining the first predicted path comprises:

determining, by a first subcomponent of the first machine-learned model based at least in part on the top-down representation, a first intermediate output comprising a context vector associated with a first target location along the first predicted path;

combining a latent feature vector with the context vector as a query vector, the latent feature vector identifying one or more characteristics of at least one of the environment or the object;

determining, by a second subcomponent of the first machine-learned model based at least in part on the query vector, a set of coarse paths associated with the object;

determining, by a third subcomponent of the first machine-learned model based at least in part on the query vector and a first portion of the top-down representation, a set of refined paths comprising a set of locations that comprise a first subset of target locations associated with the first predicted path, wherein the first portion of the top-down representation is determined based at least in part on the set of coarse paths;

determining, by a fourth subcomponent of the first machine-learned model based at least in part on the set of refined paths and a second portion of the top-down representation, a set of scores associated with the set of refined paths, wherein the second portion of the top-down representation is determined based at least in part on the set of refined paths; and wherein determining the first predicted path is based at least in part on the set of scores.

13. The one or more non-transitory computer-readable media of claim 7, wherein training the first machine-learned model and the second machine-learned model comprises:

determining a first difference between a ground truth path that the object was observed as taking and the first predicted path;

determining a second difference between the ground truth path and the second predicted path;

determining that the first difference is less than the second difference; and altering a parameter of at least one of the first machine-learned model or the second machine-learned model to reduce the first difference and exclude the second difference from training.

14. A method comprising:

determining, based at least in part on sensor data, a top-down representation of an environment in which a vehicle is operating, the top-down representation including a detection of an object in the environment;

receiving a track associated with the object indicating at least one of a historical position, a historical orientation, a historical velocity, or a historical acceleration of the object;

determining, by a first machine-learned model and based at least in part on the top-down representation and the track, a first predicted path of the object and a second predicted path associated with the object, the first predicted path comprising a time-invariant series of object states, wherein an individual object state of the time-invariant series of object states is not associated with a specific time;

determining, by a second machine-learned model based at least in part on the first predicted path and the second predicted path, a set of likelihoods comprising a first subset of likelihoods associated with the first predicted path and a second subset of likelihoods associated with the second predicted path; and controlling the vehicle based at least in part on the set of likelihoods, the first predicted path, and the second predicted path.

15. The method of claim 14, further comprising:

determining, by a third machine-learned model based at least in part on the first subset of likelihoods, the first predicted path, a current object state, and the track, a first predicted trajectory associated with the object, the first predicted trajectory comprising a first time at which the object is predicted to occupy a first location along the first predicted path; and determining, based at least in part on the second subset of likelihoods, the second predicted path, the current object state, and the track, a second predicted trajectory associated with the object, the second predicted trajectory identifying a second time at which the object is predicted to occupy a second location along the second predicted path, wherein controlling the vehicle comprises controlling the vehicle based at least in part on the first predicted trajectory and the second predicted trajectory.

16. The method of claim 14, wherein:

the set of likelihoods are part of a probability distribution or a mixture model;

determining the first predicted path comprises determining a first subset of target locations; and determining the first subset of target locations by the first machine-learned model comprises:

determining, by the second machine-learned model, the probability distribution over a superset of locations comprising the first subset of target locations or the mixture model over the superset; and determining the first subset of target locations based at least in part on determining, as the first subset of target locations, a top n locations of the superset ranked by probability indicated in the probability distribution or by component weight in the mixture model.

17. The method of claim 14, wherein determining the set of likelihoods is further based at least in part on at least one of a set of location embeddings or an object embedding associated with the object determined by a third machine-learned model based at least in part on the top-down representation.

18. The method of claim 17, further comprising determining, by a fourth machine-learned model based at least in part on the first predicted path, the set of location embeddings, and the object embedding, a predicted yaw of the object associated with a first location in the first predicted path, wherein the predicted yaw is included as part of the first predicted path.

19. The method of claim 14, wherein determining the first predicted path comprises:

determining, by a first subcomponent of the first machine-learned model based at least in part on the top-down representation, a first intermediate output comprising a context vector associated with a first target location along the first predicted path;

combining a latent feature vector with the context vector as a query vector, the latent feature vector identifying one or more characteristics of at least one of the environment or the object;

determining, by a second subcomponent of the first machine-learned model based at least in part on the query vector, a set of coarse paths associated with the object;

determining, by a third subcomponent of the first machine-learned model based at least in part on the query vector and a first portion of the top-down representation, a set of refined paths comprising a set of locations that comprise a first subset of target locations associated with the first predicted path, wherein the first portion of the top-down representation is determined based at least in part on the set of coarse paths;

determining, by a fourth subcomponent of the first machine-learned model based at least in part on the set of refined paths and a second portion of the top-down representation, a set of scores associated with the set of refined paths, wherein the second portion of the top-down representation is determined based at least in part on the set of refined paths; and wherein determining the first predicted path is based at least in part on the set of scores.

20. The method of claim 14, wherein training the first machine-learned model and the second machine-learned model comprises:

determining a first difference between a ground truth path that the object was observed as taking and the first predicted path;

determining a second difference between the ground truth path and the second predicted path;

determining that the first difference is less than the second difference; and altering a parameter of at least one of the first machine-learned model or the second machine-learned model to reduce the first difference and exclude the second difference from training.

* * * * *